United States Patent
Liu et al.

(10) Patent No.: US 10,461,916 B2
(45) Date of Patent: Oct. 29, 2019

(54) DATA TRANSMISSION METHOD AND DEVICE

(71) Applicant: Huawei Technologies Co., Ltd., Shenzhen (CN)

(72) Inventors: Kunpeng Liu, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 15/675,060

(22) Filed: Aug. 11, 2017

(65) Prior Publication Data
US 2017/0346616 A1    Nov. 30, 2017

Related U.S. Application Data

(63) Continuation of application No. PCT/CN2015/073059, filed on Feb. 13, 2015.

(51) Int. Cl.
*H04L 5/16* (2006.01)
*H04W 72/04* (2009.01)
*H04L 5/00* (2006.01)

(52) U.S. Cl.
CPC .............. *H04L 5/16* (2013.01); *H04L 5/0005* (2013.01); *H04W 72/04* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2007/0140166 A1 | 6/2007 | Eichinger et al. | |
| 2008/0119145 A1 | 5/2008 | Lee et al. | |
| 2011/0286370 A1* | 11/2011 | Tang | H04W 72/0446 370/280 |
| 2012/0243448 A1 | 9/2012 | Pan et al. | |
| 2012/0257551 A1 | 10/2012 | Diao et al. | |
| 2013/0188530 A1* | 7/2013 | Pirskanen | H04W 72/0453 370/280 |

(Continued)

FOREIGN PATENT DOCUMENTS

| | | |
|---|---|---|
| CN | 101778392 A | 7/2010 |
| CN | 102014514 A | 4/2011 |
| CN | 102118860 A | 7/2011 |

(Continued)

*Primary Examiner* — Saumit Shah
(74) *Attorney, Agent, or Firm* — Leydig, Voit & Mayer, Ltd.

(57) ABSTRACT

The embodiments discloses a data transmission method and device. The method includes: separately configuring, by an eNodeB in different time units on a specific frequency band according to a TDD mode or an FDD mode, an uplink frequency resource used for transmitting uplink data and a downlink frequency resource used for transmitting downlink data; and sending, by the eNodeB, downlink data to user equipment UE by using the configured downlink frequency resource, and receiving, by using the configured uplink frequency resource, uplink data sent by the UE, so that an uplink frequency resource and a downlink frequency resource are configured in different time units on a same frequency band according to both a TDD mode and an FDD mode.

15 Claims, 16 Drawing Sheets

---

101

An eNodeB separately configures, in different time units on a specific frequency band according to a TDD mode or an FDD mode, an uplink frequency resource used for transmitting uplink data and a downlink frequency resource used for transmitting downlink data

102

The eNodeB sends downlink data to user equipment UE by using the configured downlink frequency resource, and receives, by using the configured uplink frequency resource, uplink data sent by the UE

(56) References Cited

U.S. PATENT DOCUMENTS

2013/0188536 A1 7/2013 Pirskanen et al.
2014/0126501 A1* 5/2014 Pan .................. H04L 5/0032
 370/329

FOREIGN PATENT DOCUMENTS

| EP | 2613600 A1 | 7/2013 |
| EP | 2680654 A1 | 1/2014 |
| WO | 2014074036 A1 | 5/2014 |

* cited by examiner

| Guard period GP |
|---|
| U |
| Guard period GP |
| D |
| Guard period GP |
| U |
| Guard period GP |
| D |
| Guard period GP |
| U |
| Guard period GP |
| ... |
| D |
| Guard period GP |
| U |
| Guard period GP |
| D |
| Guard period GP |

FIG. 3(c)

| |
|---|
| Guard period GP |
| U |
| Guard period GP |
| D |
| Guard period GP |
| U |
| Guard period GP |
| D |
| Guard period GP |
| U |
| Guard period GP |
| ... |
| D |
| Guard period GP |
| U |
| Guard period GP |
| D |
| Guard period GP |

FIG. 3(d)

DATA TRANSMISSION METHOD AND DEVICE

CROSS-REFERENCE TO RELATED APPLICATIONS

This application is a continuation of International Application No. PCT/CN2015/073059, filed on Feb. 13, 2015, the disclosure of which is hereby incorporated by reference in its entirety.

TECHNICAL FIELD

Embodiments of the present invention relate to the field of wireless communications technologies, and in particular, to a data transmission method and device.

BACKGROUND

Currently, radio spectrum resources used in a cellular mobile communications network are limited to only some fixed frequency bands such as 900 MHz and 1800 MHz, and there are more high-band radio spectrum resources that are not used in the cellular mobile communications network. With an increase of mobile data traffic, how to effectively use a high-band radio spectrum resource in a cellular mobile communications network becomes an urgent problem to be resolved.

In an LTE (English: Long Term Evolution) system, two types of signal transmission modes are defined: an FDD (English: Frequency Division Duplex) mode and a TDD (English: Time Division Duplex) mode.

In the FDD mode, data is received and sent on two separate symmetric frequency channels, and a channel used for receiving data and a channel used for sending data are separated by using a guard band. This means that paired frequencies have to be used in the FDD, uplink data is distinguished from downlink data by using symmetric frequencies, and resource allocation is continuous in terms of time. In practical application, a disadvantage is as follows: Using the FDD mode for asymmetric service data reduces spectrum resource utilization.

In the TDD mode, a channel for receiving data and a channel for sending data are separated by means of time. Specifically, in a cellular communications network that uses the TDD mode, data of a receiver and data of a transmitter are carried by using channels that are at a same frequency and in different timeslots, and resource allocation is discontinuous in terms of time. In practical application, a disadvantage is as follows: In the TDD mode, a transmit channel and a receive channel that are at a same frequency are used. Consequently, intra-system interference and inter-system interference are caused. To avoid the inter-system interference, a relatively large guard band is reserved, and spectrum resource utilization is relatively low.

For a high-band radio spectrum resource, a bandwidth granularity (for example, 1 G or 2 G) in a subframe is far greater than a bandwidth granularity in a subframe in a current cellular communications network. If the foregoing TDD mode or the foregoing FDD mode is used, a problem of low spectrum resource utilization still exists.

SUMMARY

In view of this, embodiments of the present invention provide a data transmission method and device, so as to resolve an existing problem of low spectrum resource utilization.

According to a first aspect, a data transmission method is provided, including:

separately configuring, by an eNodeB in different time units on a specific frequency band according to different duplex modes, an uplink frequency resource used for transmitting uplink data and a downlink frequency resource used for transmitting downlink data, where the different duplex modes include a time division duplex TDD mode, a frequency division duplex FDD mode, and a full-duplex mode; and sending, by the eNodeB, downlink data to user equipment UE by using the configured downlink frequency resource, and receiving, by using the configured uplink frequency resource, uplink data sent by the UE.

With reference to the first aspect, in a first possible implementation of the first aspect, the separately configuring, by an eNodeB in different time units on a specific frequency band according to different duplex modes, an uplink frequency resource used for transmitting uplink data and a downlink frequency resource used for transmitting downlink data includes:

configuring, by the eNodeB, the specific frequency band as the uplink frequency resource or configuring the specific frequency band as the downlink frequency resource in a first time unit according to a TDD mode;

configuring, by the eNodeB, a first frequency resource on the specific frequency band as the uplink frequency resource and configuring a second frequency resource on the specific frequency band as the downlink frequency resource in a second time unit according to an FDD mode, where the first frequency resource and the second frequency resource do not overlap;

configuring, by the eNodeB, the first frequency resource on the specific frequency band as the uplink frequency resource and configuring the second frequency resource on the specific frequency band as the downlink frequency resource in a third time unit according to an FDD mode, and configuring a third frequency resource on the specific frequency band as both the uplink frequency resource and the downlink frequency resource in the third time unit according to a full-duplex mode; and configuring, by the eNodeB, the specific frequency band as both the uplink frequency resource and the downlink frequency resource in a fourth time unit according to a full-duplex mode.

With reference to the first aspect or the first possible implementation of the first aspect, in a second possible implementation of the first aspect, the uplink frequency resource and the downlink frequency resource that are configured by the eNodeB in different time units according to an FDD mode are changeable.

With reference to the second possible implementation of the first aspect, in a third possible implementation of the first aspect, the uplink frequency resource and the downlink frequency resource that are configured by the eNodeB in different time units according to an FDD mode meet at least one of the following cases:

the uplink frequency resource/the downlink frequency resource configured by the eNodeB in a time unit on the specific frequency band according to an FDD mode meets discrete distribution;

the uplink frequency resource configured by the eNodeB in a time unit on the specific frequency band according to an FDD mode is distributed on two sidebands in the specific frequency band, where the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;

the downlink frequency resource configured by the eNodeB in a time unit on the specific frequency band according to an FDD mode is distributed on a third subband that is centered on a center carrier of the specific frequency band and that is distributed symmetrically and continuously, where a bandwidth occupied by the third subband is less than a total available bandwidth of the specific frequency band;

the uplink frequency resource configured by the eNodeB in a time unit on the specific frequency band according to an FDD mode is distributed on a fourth subband that is centered on a center carrier of the specific frequency band and that is distributed symmetrically and continuously, where a bandwidth occupied by the fourth subband is less than a total available bandwidth of the specific frequency band; or the uplink frequency resource/the downlink frequency resource configured by the eNodeB in a time unit according to an FDD mode is continuously distributed.

With reference to the third possible implementation of the first aspect, in a fourth possible implementation of the first aspect, if the uplink frequency resource and the downlink frequency resource that are configured by the eNodeB in a time unit according to an FDD mode meet discrete distribution, the uplink frequency resource and the downlink frequency resource meet equal-interval distribution.

With reference to the third possible implementation of the first aspect or the fourth possible implementation of the first aspect, in a fifth possible implementation of the first aspect, if the uplink frequency resource/the downlink frequency resource configured by the eNodeB in a time unit according to an FDD mode is continuously distributed, a proportion of the configured uplink frequency resource to the configured downlink frequency resource is changeable.

With reference to the third possible implementation of the first aspect, the fourth possible implementation of the first aspect, or the fifth possible implementation of the first aspect, in a sixth possible implementation of the first aspect, if the uplink frequency resource/the downlink frequency resource configured in an FDD mode meets discrete distribution, and/or the uplink frequency resource and the downlink frequency resource that are configured in an FDD mode meet equal-interval distribution, the uplink frequency resource is used for sending an uplink measurement pilot signal;

if the uplink frequency resource configured in an FDD mode is distributed on two sidebands in the specific frequency band, the uplink frequency resource is used for sending a hybrid automatic repeat request HARQ signal;

if the downlink frequency resource configured in an FDD mode is distributed on the third subband that is centered on the center carrier of the specific frequency band and that is distributed symmetrically and continuously, the downlink frequency resource is used for sending a synchronization signal or a broadcast signal; and if the uplink frequency resource configured in an FDD mode is distributed on the fourth subband that is centered on the center carrier of the specific frequency band and that is distributed symmetrically and continuously, the uplink frequency resource is used for sending a random access channel.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation of the first aspect, the separately configuring, by an eNodeB in different time units on a specific frequency band according to different duplex modes, an uplink frequency resource used for transmitting uplink data and a downlink frequency resource used for transmitting downlink data includes:

determining, by the eNodeB on the specific frequency band, a duplex mode for transmitting data in each time unit, where the duplex mode includes at least one of a TDD mode, an FDD mode, or a full-duplex mode; and for each time unit, if it is determined that a duplex mode for transmitting data in a time unit is a TDD mode, configuring, by the eNodeB in the TDD mode, an uplink frequency resource used for transmitting uplink data in the time unit and a downlink frequency resource used for transmitting downlink data in the time unit; if it is determined that a duplex mode for transmitting data in a time unit is an FDD mode, configuring, by the eNodeB in the FDD mode, an uplink frequency resource used for transmitting uplink data in the time unit and a downlink frequency resource used for transmitting downlink data in the time unit; and if it is determined that a duplex mode for transmitting data in a time unit is a full-duplex mode, configuring, by the eNodeB in the full-duplex mode, an uplink frequency resource used for transmitting uplink data in the time unit and a downlink frequency resource used for transmitting downlink data in the time unit.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation of the first aspect, the method further includes:

sending, by the eNodeB, dynamic signaling to the UE, where configuration information of an uplink frequency resource in different time units and configuration information of a downlink frequency resource in different time units are indicated in the dynamic signaling, and the configuration information includes a resource location and/or a bandwidth occupied by a resource.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation of the first aspect, the method further includes:

sending, by the eNodeB, semi-static signaling to the UE, where duplex modes for configuring an uplink frequency resource and a downlink frequency resource in different time units are indicated in the semi-static signaling, and the duplex modes include at least one of a TDD mode, an FDD mode, or a full-duplex mode.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in a tenth possible implementation of the first aspect, the method further includes:

sending, by the eNodeB, semi-static signaling to the UE, where the semi-static signaling is used to indicate duplex modes for configuring an uplink frequency resource and a downlink frequency resource in different time units, and the duplex modes include at least one of a TDD mode, an FDD mode, or a full-duplex mode; and sending, by the eNodeB, dynamic signaling to the UE, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, or the tenth possible implementation of the first aspect, in an eleventh possible implementation of the first aspect, the time unit includes a first type of time unit and a second type of time unit;

a duplex mode for configuring an uplink frequency resource and a downlink frequency resource in the first type of time unit is unchangeable; and a duplex mode for configuring an uplink frequency resource and a downlink frequency resource in the second type of time unit is changeable.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, the tenth possible implementation of the first aspect, or the eleventh possible implementation of the first aspect, in a twelfth possible implementation of the first aspect, the time unit includes a third type of time unit and a fourth type of time unit;

configuration information of an uplink frequency resource configured in the third type of time unit and configuration information of a downlink frequency resource configured in the third type of time unit are unchangeable; and configuration information of an uplink frequency resource configured in the fourth type of time unit and configuration information of a downlink frequency resource configured in the fourth type of time unit are changeable.

With reference to the eleventh possible implementation of the first aspect or the twelfth possible implementation of the first aspect, in a thirteenth possible implementation of the first aspect, the first type of time unit, the second type of time unit, the third type of time unit, and the fourth type of time unit meet a time division multiplexing requirement, and the first type of time unit and the third type of time unit meet a periodic requirement.

With reference to the eighth possible implementation of the first aspect, the ninth possible implementation of the first aspect, the tenth possible implementation of the first aspect, the eleventh possible implementation of the first aspect, the twelfth possible implementation of the first aspect, or the thirteenth possible implementation of the first aspect, in a fourteenth possible implementation of the first aspect, the dynamic signaling or the semi-static signaling further includes information about a guard period GP.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, the tenth possible implementation of the first aspect, the eleventh possible implementation of the first aspect, the twelfth possible implementation of the first aspect, the thirteenth possible implementation of the first aspect, or the fourteenth possible implementation of the first aspect, in a fifteenth possible implementation of the first aspect, the time unit includes at least one of the following:

a radio-frame-based time unit, a subframe-based time unit, a timeslot-based time unit, or a symbol-based time unit.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, the tenth possible implementation of the first aspect, the eleventh possible implementation of the first aspect, the twelfth possible implementation of the first aspect, the thirteenth possible implementation of the first aspect, the fourteenth possible implementation of the first aspect, or the fifteenth possible implementation of the first aspect, in a sixteenth possible implementation of the first aspect, the specific frequency band is a continuous spectrum resource.

According to a second aspect, a data transmission method is provided, including:

receiving, by user equipment UE on a configured downlink frequency resource, downlink data sent by an eNodeB, and sending uplink data to the eNodeB on a configured uplink frequency resource, where the configured uplink frequency resource is an uplink frequency resource that is used for transmitting uplink data and that is configured by the eNodeB in different time units on a specific frequency band according to different duplex modes, the configured downlink frequency resource is a downlink frequency resource that is used for transmitting downlink data and that is configured by the eNodeB in different time units on the specific frequency band according to different duplex modes, and the different duplex modes include a time division duplex TDD mode, a frequency division duplex FDD mode, and a full-duplex mode.

With reference to the second aspect, in a first possible implementation of the second aspect, the method further includes:

receiving, by the UE, dynamic signaling sent by the eNodeB, where configuration information of an uplink frequency resource in different time units and configuration information of a downlink frequency resource in different time units are indicated in the dynamic signaling, and the configuration information includes a resource location and/or a bandwidth occupied by a resource.

With reference to the second aspect or the first possible implementation of the second aspect, in a second possible implementation of the second aspect, the method further includes:

receiving, by the UE, semi-static signaling sent by the eNodeB, where duplex modes for configuring an uplink frequency resource and a downlink frequency resource in different time units are indicated in the semi-static signaling, and the duplex modes include at least one of a TDD mode, an FDD mode, or a full-duplex mode.

With reference to the second aspect, the first possible implementation of the second aspect, or the second possible implementation of the second aspect, in a third possible implementation of the second aspect, the method further includes:

receiving, by the UE, semi-static signaling sent by the eNodeB, where the semi-static signaling is used to indicate duplex modes for configuring an uplink frequency resource and a downlink frequency resource in different time units, and the duplex modes include at least one of a TDD mode, an FDD mode, or a full-duplex mode; and receiving, by the UE, dynamic signaling sent by the eNodeB, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

According to a third aspect, a data transmission device is provided, including:

a determining unit, configured to separately configure, in different time units on a specific frequency band according to different duplex modes, an uplink frequency resource used for transmitting uplink data and a downlink frequency resource used for transmitting downlink data, where the different duplex modes include a time division duplex TDD mode, a frequency division duplex FDD mode, and a full-duplex mode;

a sending unit, configured to send downlink data to user equipment UE by using the configured downlink frequency resource; and a receiving unit, configured to receive, by using the configured uplink frequency resource, uplink data sent by the UE.

With reference to the third aspect, in a first possible implementation of the third aspect, the determining unit is specifically configured to: configure the specific frequency band as the uplink frequency resource or configure the specific frequency band as the downlink frequency resource in a first time unit according to a TDD mode;

configure a first frequency resource on the specific frequency band as the uplink frequency resource and configure a second frequency resource on the specific frequency band as the downlink frequency resource in a second time unit according to an FDD mode, where the first frequency resource and the second frequency resource do not overlap;

configure the first frequency resource on the specific frequency band as the uplink frequency resource and configure the second frequency resource on the specific frequency band as the downlink frequency resource in a third time unit according to an FDD mode, and configure a third frequency resource on the specific frequency band as both the uplink frequency resource and the downlink frequency resource in the third time unit according to a full-duplex mode; and configure the specific frequency band as both the uplink frequency resource and the downlink frequency resource in a fourth time unit according to a full-duplex mode.

With reference to the third aspect or the first possible implementation of the third aspect, in a second possible implementation of the third aspect, the uplink frequency resource and the downlink frequency resource that are configured by the determining unit in different time units according to an FDD mode are changeable.

With reference to the second possible implementation of the third aspect, in a third possible implementation of the third aspect, the uplink frequency resource and the downlink frequency resource that are configured by the determining unit in different time units according to an FDD mode meet at least one of the following cases:

the uplink frequency resource/the downlink frequency resource configured in a time unit on the specific frequency band according to an FDD mode meets discrete distribution;

the uplink frequency resource configured in a time unit on the specific frequency band according to an FDD mode is distributed on two sidebands in the specific frequency band, where the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;

the downlink frequency resource configured in a time unit on the specific frequency band according to an FDD mode is distributed on a third subband that is centered on a center carrier of the specific frequency band and that is distributed symmetrically and continuously, where a bandwidth occupied by the third subband is less than a total available bandwidth of the specific frequency band;

the uplink frequency resource configured in a time unit on the specific frequency band according to an FDD mode is distributed on a fourth subband that is centered on a center carrier of the specific frequency band and that is distributed symmetrically and continuously, where a bandwidth occupied by the fourth subband is less than a total available bandwidth of the specific frequency band; or the uplink frequency resource/the downlink frequency resource configured in a time unit according to an FDD mode is continuously distributed.

With reference to the third possible implementation of the third aspect, in a fourth possible implementation of the third aspect, if the uplink frequency resource and the downlink frequency resource that are configured by the determining unit in a time unit according to an FDD mode meet discrete distribution, the uplink frequency resource and the downlink frequency resource meet equal-interval distribution.

With reference to the third possible implementation of the third aspect or the fourth possible implementation of the third aspect, in a fifth possible implementation of the third aspect, if the uplink frequency resource/the downlink frequency resource configured by the determining unit in a time unit according to an FDD mode is continuously distributed, a proportion of the configured uplink frequency resource to the configured downlink frequency resource is changeable.

With reference to the third possible implementation of the third aspect, the fourth possible implementation of the third aspect, or the fifth possible implementation of the third aspect, in a sixth possible implementation of the third aspect, if the uplink frequency resource/the downlink frequency resource configured in an FDD mode meets discrete distribution, and/or the uplink frequency resource and the downlink frequency resource that are configured in an FDD mode meet equal-interval distribution, the uplink frequency resource is used for sending an uplink measurement pilot signal;

if the uplink frequency resource configured in an FDD mode is distributed on two sidebands in the specific frequency band, the uplink frequency resource is used for sending a hybrid automatic repeat request HARQ signal;

if the downlink frequency resource configured in an FDD mode is distributed on the third subband that is centered on the center carrier of the specific frequency band and that is distributed symmetrically and continuously, the downlink frequency resource is used for sending a synchronization signal or a broadcast signal; and if the uplink frequency resource configured in an FDD mode is distributed on the fourth subband that is centered on the center carrier of the specific frequency band and that is distributed symmetrically and continuously, the uplink frequency resource is used for sending a random access channel.

With reference to the third aspect, the first possible implementation of the third aspect, the second possible implementation of the third aspect, the third possible implementation of the third aspect, the fourth possible implementation of the third aspect, the fifth possible implementation of the third aspect, or the sixth possible implementation of the third aspect, in a seventh possible implementation of the third aspect, the determining unit is specifically configured to: determine, on the specific frequency band, a duplex mode for transmitting data in each time unit, where the duplex mode includes at least one of a TDD mode, an FDD mode, or a full-duplex mode; and for each time unit, if it is determined that a duplex mode for transmitting data in a time unit is a TDD mode, configure, in the TDD mode, an uplink frequency resource used for transmitting uplink data in the time unit and a downlink frequency resource used for transmitting downlink data in the time unit; if it is determined that a duplex mode for transmitting data in a time unit is an FDD mode, configure, in the FDD mode, an uplink frequency resource used for transmitting uplink data in the time unit and a downlink frequency resource used for transmitting downlink data in the time unit; and if it is determined that a duplex mode for transmitting data in a time unit is a full-duplex mode, configure, in the full-duplex mode, an uplink frequency resource used for transmitting uplink data in the time unit and a downlink frequency resource used for transmitting downlink data in the time unit.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, or the seventh possible implementation of the third aspect, in an eighth possible implementation of the third aspect, the sending unit is further configured to send dynamic signaling to the UE, where configuration information of an uplink frequency resource in different time units and configuration information of a downlink frequency resource in different time units are indicated in the dynamic signaling, and the configuration information includes a resource location and/or a bandwidth occupied by a resource.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, or the eighth possible implementation of the third aspect, in a ninth possible implementation of the third aspect, the sending unit is further configured to send semi-static signaling to the UE, where duplex modes for configuring an uplink frequency resource and a downlink frequency resource in different time units are indicated in the semi-static signaling, and the duplex modes include at least one of a TDD mode, an FDD mode, or a full-duplex mode.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, or the seventh possible implementation of the third aspect, in a tenth possible implementation of the third aspect, the sending unit is further configured to: send semi-static signaling to the UE, where the semi-static signaling is used to indicate duplex modes for configuring an uplink frequency resource and a downlink frequency resource in different time units, and the duplex modes include at least one of a TDD mode, an FDD mode, or a full-duplex mode; and send dynamic signaling to the UE, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, or the tenth possible implementation of the third aspect, in an eleventh possible implementation of the third aspect, the time unit includes a first type of time unit and a second type of time unit;

a duplex mode for configuring an uplink frequency resource and a downlink frequency resource in the first type of time unit is unchangeable; and a duplex mode for configuring an uplink frequency resource and a downlink frequency resource in the second type of time unit is changeable.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, or the eleventh possible implementation of the third aspect, in a twelfth possible implementation of the third aspect, the time unit includes a third type of time unit and a fourth type of time unit;

configuration information of an uplink frequency resource configured in the third type of time unit and configuration information of a downlink frequency resource configured in the third type of time unit are unchangeable; and configuration information of an uplink frequency resource configured in the fourth type of time unit and configuration information of a downlink frequency resource configured in the fourth type of time unit are changeable.

With reference to the eleventh possible implementation of the third aspect or the twelfth possible implementation of the third aspect, in a thirteenth possible implementation of the third aspect, the first type of time unit, the second type of time unit, the third type of time unit, and the fourth type of time unit meet a time division multiplexing requirement, and the first type of time unit and the third type of time unit meet a periodic requirement.

With reference to the eighth possible implementation of the third aspect, the ninth possible implementation of the third aspect, the tenth possible implementation of the third aspect, the eleventh possible implementation of the third aspect, the twelfth possible implementation of the third aspect, or the thirteenth possible implementation of the third aspect, in a fourteenth possible implementation of the third aspect, the dynamic signaling or the semi-static signaling further includes information about a guard period GP.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, the eleventh possible implementation of the third aspect, the twelfth possible implementation of the third aspect, the thirteenth possible implementation of the third aspect, or the fourteenth possible implementation of the third aspect, in a fifteenth possible implementation of the third aspect, the time unit includes at least one of the following:

a radio-frame-based time unit, a subframe-based time unit, a timeslot-based time unit, or a symbol-based time unit.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, the eleventh possible implementation of the third aspect, the twelfth possible implementation of the third aspect, the thirteenth possible implementation of the third aspect, the fourteenth possible implementation of the third aspect, or the fifteenth possible implementation of the third aspect, in a sixteenth possible implementation of the third aspect, the specific frequency band is a continuous spectrum resource.

According to a fourth aspect, a data transmission device is provided, including:

a receiving unit, configured to receive, on a configured downlink frequency resource, downlink data sent by an eNodeB; and a sending unit, configured to send uplink data to the eNodeB on a configured uplink frequency resource, where the configured uplink frequency resource is an uplink frequency resource that is used for transmitting uplink data and that is configured by the eNodeB in different time units on a specific frequency band according to different duplex modes, the configured downlink frequency resource is a downlink frequency resource that is used for transmitting downlink data and that is configured by the eNodeB in different time units on the specific frequency band according to different duplex modes, and the different duplex modes include a time division duplex TDD mode, a frequency division duplex FDD mode, and a full-duplex mode.

With reference to the fourth aspect, in a first possible implementation of the fourth aspect, the receiving unit is further configured to receive dynamic signaling sent by the eNodeB, where configuration information of an uplink frequency resource in different time units and configuration information of a downlink frequency resource in different time units are indicated in the dynamic signaling, and the configuration information includes a resource location and/or a bandwidth occupied by a resource.

With reference to the fourth aspect or the first possible implementation of the fourth aspect, in a second possible implementation of the fourth aspect, the receiving unit is further configured to receive semi-static signaling sent by the eNodeB, where duplex modes for configuring an uplink frequency resource and a downlink frequency resource in different time units are indicated in the semi-static signaling, and the duplex modes include at least one of a TDD mode, an FDD mode, or a full-duplex mode.

With reference to the fourth aspect, the first possible implementation of the fourth aspect, or the second possible implementation of the fourth aspect, in a third possible implementation of the fourth aspect, the receiving unit is further configured to: receive semi-static signaling sent by the eNodeB, where the semi-static signaling is used to indicate duplex modes for configuring an uplink frequency resource and a downlink frequency resource in different time units, and the duplex modes include at least one of a TDD mode, an FDD mode, or a full-duplex mode; and receive dynamic signaling sent by the eNodeB, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

According to a fifth aspect, a data transmission device is provided, including:

a processor, configured to separately configure, in different time units on a specific frequency band according to different duplex modes, an uplink frequency resource used for transmitting uplink data and a downlink frequency resource used for transmitting downlink data, where the different duplex modes include a time division duplex TDD mode, a frequency division duplex FDD mode, and a full-duplex mode;

a signal transmitter, configured to send downlink data to user equipment UE by using the configured downlink frequency resource; and a signal receiver, configured to receive, by using the configured uplink frequency resource, uplink data sent by the UE.

With reference to the fifth aspect, in a first possible implementation of the fifth aspect, the processor is specifically configured to: configure the specific frequency band as the uplink frequency resource or configure the specific frequency band as the downlink frequency resource in a first time unit according to a TDD mode;

configure a first frequency resource on the specific frequency band as the uplink frequency resource and configure a second frequency resource on the specific frequency band as the downlink frequency resource in a second time unit according to an FDD mode, where the first frequency resource and the second frequency resource do not overlap;

configure the first frequency resource on the specific frequency band as the uplink frequency resource and configure the second frequency resource on the specific frequency band as the downlink frequency resource in a third time unit according to an FDD mode, and configure a third frequency resource on the specific frequency band as both the uplink frequency resource and the downlink frequency resource in the third time unit according to a full-duplex mode; and configure the specific frequency band as both the uplink frequency resource and the downlink frequency resource in a fourth time unit according to a full-duplex mode.

With reference to the fifth aspect or the first possible implementation of the fifth aspect, in a second possible implementation of the fifth aspect, the uplink frequency resource and the downlink frequency resource that are configured by the processor in different time units according to an FDD mode are changeable.

With reference to the second possible implementation of the fifth aspect, in a third possible implementation of the fifth aspect, the uplink frequency resource and the downlink frequency resource that are configured by the processor in different time units according to an FDD mode meet at least one of the following cases:

the uplink frequency resource/the downlink frequency resource configured in a time unit on the specific frequency band according to an FDD mode meets discrete distribution;

the uplink frequency resource configured in a time unit on the specific frequency band according to an FDD mode is distributed on two sidebands in the specific frequency band, where the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;

the downlink frequency resource configured in a time unit on the specific frequency band according to an FDD mode is distributed on a third subband that is centered on a center carrier of the specific frequency band and that is distributed symmetrically and continuously, where a bandwidth occupied by the third subband is less than a total available bandwidth of the specific frequency band;

the uplink frequency resource configured in a time unit on the specific frequency band according to an FDD mode is distributed on a fourth subband that is centered on a center carrier of the specific frequency band and that is distributed symmetrically and continuously, where a bandwidth occupied by the fourth subband is less than a total available bandwidth of the specific frequency band; or the uplink frequency resource/the downlink frequency resource configured in a time unit according to an FDD mode is continuously distributed.

With reference to the third possible implementation of the fifth aspect, in a fourth possible implementation of the fifth aspect, if the uplink frequency resource and the downlink frequency resource that are configured by the processor in a time unit according to an FDD mode meet discrete distribution, the uplink frequency resource and the downlink frequency resource meet equal-interval distribution.

With reference to the third possible implementation of the fifth aspect or the fourth possible implementation of the fifth aspect, in a fifth possible implementation of the fifth aspect, if the uplink frequency resource/the downlink frequency resource configured by the processor in a time unit according to an FDD mode is continuously distributed, a proportion of the configured uplink frequency resource to the configured downlink frequency resource is changeable.

With reference to the third possible implementation of the fifth aspect, the fourth possible implementation of the fifth aspect, or the fifth possible implementation of the fifth aspect, in a sixth possible implementation of the fifth aspect, if the uplink frequency resource/the downlink frequency resource configured in an FDD mode meets discrete distribution, and/or the uplink frequency resource and the downlink frequency resource that are configured in an FDD mode meet equal-interval distribution, the uplink frequency resource is used for sending an uplink measurement pilot signal;

if the uplink frequency resource configured in an FDD mode is distributed on two sidebands in the specific frequency band, the uplink frequency resource is used for sending a hybrid automatic repeat request HARQ signal;

if the downlink frequency resource configured in an FDD mode is distributed on the third subband that is centered on the center carrier of the specific frequency band and that is distributed symmetrically and continuously, the downlink frequency resource is used for sending a synchronization signal or a broadcast signal; and if the uplink frequency resource configured in an FDD mode is distributed on the fourth subband that is centered on the center carrier of the specific frequency band and that is distributed symmetrically and continuously, the uplink frequency resource is used for sending a random access channel.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, or the sixth possible implementation of the fifth aspect, in a seventh possible implementation of the fifth aspect, the processor is specifically configured to: determine, on the specific frequency band, a duplex mode for transmitting data in each time unit, where the duplex mode includes at least one of a TDD mode, an FDD mode, or a full-duplex mode; and for each time unit, if it is determined that a duplex mode for transmitting data in a time unit is a TDD mode, configure, in the TDD mode, an uplink frequency resource used for transmitting uplink data in the time unit and a downlink frequency resource used for transmitting downlink data in the time unit; if it is determined that a duplex mode for transmitting data in a time unit is an FDD mode, configure, in the FDD mode, an uplink frequency resource used for transmitting uplink data in the time unit and a downlink frequency resource used for transmitting downlink data in the time unit; and if it is determined that a duplex mode for transmitting data in a time unit is a full-duplex mode, configure, in the full-duplex mode, an uplink frequency resource used for transmitting uplink data in the time unit and a downlink frequency resource used for transmitting downlink data in the time unit.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, or the seventh possible implementation of the fifth aspect, in an eighth possible implementation of the fifth aspect, the signal transmitter is further configured to send dynamic signaling to the UE, where configuration information of an uplink frequency resource in different time units and configuration information of a downlink frequency resource in different time units are indicated in the dynamic signaling, and the configuration information includes a resource location and/or a bandwidth occupied by a resource.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, or the eighth possible implementation of the fifth aspect, in a ninth possible implementation of the fifth aspect, the signal transmitter is further configured to send semi-static signaling to the UE, where duplex modes for configuring an uplink frequency resource and a downlink frequency resource in different time units are indicated in the semi-static signaling, and the duplex modes include at least one of a TDD mode, an FDD mode, or a full-duplex mode.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, or the seventh possible implementation of the fifth aspect, in a tenth possible implementation of the fifth aspect, the signal transmitter is further configured to: send semi-static signaling to the UE, where the semi-static signaling is used to indicate duplex modes for configuring an uplink frequency resource and a downlink frequency resource in different time units, and the duplex modes include at least one of a TDD mode, an FDD mode, or a full-duplex mode; and send dynamic signaling to the UE, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, or the tenth possible implementation of the fifth aspect, in an eleventh possible implementation of the fifth aspect, the time unit includes a first type of time unit and a second type of time unit;

a duplex mode for configuring an uplink frequency resource and a downlink frequency resource in the first type of time unit is unchangeable; and a duplex mode for configuring an uplink frequency resource and a downlink frequency resource in the second type of time unit is changeable.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, the tenth possible implementation of the fifth aspect, or the eleventh possible implementation of the fifth aspect, in a twelfth possible implementation of the fifth aspect, the time unit includes a third type of time unit and a fourth type of time unit;

configuration information of an uplink frequency resource configured in the third type of time unit and configuration information of a downlink frequency resource configured in the third type of time unit are unchangeable; and configuration information of an uplink frequency resource configured in the fourth type of time unit and configuration information of a downlink frequency resource configured in the fourth type of time unit are changeable.

With reference to the eleventh possible implementation of the fifth aspect or the twelfth possible implementation of the fifth aspect, in a thirteenth possible implementation of the fifth aspect, the first type of time unit, the second type of time unit, the third type of time unit, and the fourth type of time unit meet a time division multiplexing requirement, and the first type of time unit and the third type of time unit meet a periodic requirement.

With reference to the eighth possible implementation of the fifth aspect, the ninth possible implementation of the fifth aspect, the tenth possible implementation of the fifth aspect, the eleventh possible implementation of the fifth aspect, the twelfth possible implementation of the fifth aspect, or the thirteenth possible implementation of the fifth aspect, in a fourteenth possible implementation of the fifth aspect, the dynamic signaling or the semi-static signaling further includes information about a guard period GP.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, the tenth possible implementation of the fifth aspect, the eleventh possible implementation of the fifth aspect, the twelfth possible implementation of the fifth aspect, the thirteenth possible implementation of the fifth aspect, or the fourteenth possible implementation of the fifth aspect, in a fifteenth possible implementation of the fifth aspect, the time unit includes at least one of the following:

a radio-frame-based time unit, a subframe-based time unit, a timeslot-based time unit, or a symbol-based time unit.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, the tenth possible implementation of the fifth aspect, the eleventh possible implementation of the fifth aspect, the twelfth possible implementation of the fifth aspect, the thirteenth possible implementation of the fifth aspect, the fourteenth possible implementation of the fifth aspect, or the fifteenth possible implementation of the fifth aspect, in a sixteenth possible implementation of the fifth aspect, the specific frequency band is a continuous spectrum resource.

According to a sixth aspect, a data transmission device is provided, including:

a signal receiver, configured to receive, on a configured downlink frequency resource, downlink data sent by an eNodeB; and a signal transmitter, configured to send uplink data to the eNodeB on a configured uplink frequency resource, where the configured uplink frequency resource is an uplink frequency resource that is used for transmitting uplink data and that is configured by the eNodeB in different time units on a specific frequency band according to different duplex modes, the configured downlink frequency resource is a downlink frequency resource that is used for transmitting downlink data and that is configured by the eNodeB in different time units on the specific frequency band according to different duplex modes, and the different duplex modes include a time division duplex TDD mode, a frequency division duplex FDD mode, and a full-duplex mode.

With reference to the sixth aspect, in a first possible implementation of the sixth aspect, the signal receiver is further configured to receive dynamic signaling sent by the eNodeB, where configuration information of an uplink frequency resource in different time units and configuration information of a downlink frequency resource in different time units are indicated in the dynamic signaling, and the configuration information includes a resource location and/or a bandwidth occupied by a resource.

With reference to the sixth aspect or the first possible implementation of the sixth aspect, in a second possible implementation of the sixth aspect, the signal receiver is further configured to receive semi-static signaling sent by the eNodeB, where duplex modes for configuring an uplink frequency resource and a downlink frequency resource in different time units are indicated in the semi-static signaling, and the duplex modes include at least one of a TDD mode, an FDD mode, or a full-duplex mode.

With reference to the sixth aspect, the first possible implementation of the sixth aspect, or the second possible implementation of the sixth aspect, in a third possible implementation of the sixth aspect, the signal receiver is further configured to: receive semi-static signaling sent by the eNodeB, where the semi-static signaling is used to indicate duplex modes for configuring an uplink frequency resource and a downlink frequency resource in different time units, and the duplex modes include at least one of a TDD mode, an FDD mode, or a full-duplex mode; and receive dynamic signaling sent by the eNodeB, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

Beneficial effects of the embodiments of the present invention:

An eNodeB in the embodiments of the present invention separately configures, in different time units on a specific frequency band according to different duplex modes, an uplink frequency resource used for transmitting uplink data and a downlink frequency resource used for transmitting downlink data, where the different duplex modes include a TDD mode, an FDD mode, and a full-duplex mode; and sends downlink data to UE by using the configured downlink frequency resource, and receives, by using the configured uplink frequency resource, uplink data sent by the UE. The eNodeB separately configures, in different time units on a specific frequency band according to different duplex modes, an uplink frequency resource for transmitting uplink data and a downlink frequency resource for transmitting downlink data, so that an uplink frequency resource and a downlink frequency resource are configured in different time units on a same frequency band according to a variety of duplex modes. In this way, in a high-frequency and large-bandwidth case, an uplink frequency resource and a downlink frequency resource in different time units on a same frequency band are flexibly adjusted to meet an uplink and downlink service data need, and utilization of a system frequency resource is effectively improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 3(c) is a schematic diagram in which a downlink frequency resource configured by an eNodeB in a time unit according to an FDD mode meets equal-interval distribution;

FIG. 3(d) is a schematic diagram in which an uplink frequency resource/the downlink frequency resource configured by an eNodeB in a time unit according to an FDD mode meets discrete distribution, and the uplink frequency resource and the downlink frequency resource meet equal-interval distribution;

DESCRIPTION OF EMBODIMENTS

To achieve the objective of the present invention, embodiments of the present invention provide a data transmission method and device. An eNodeB separately configures, in different time units on a specific frequency band according to different duplex modes, an uplink frequency resource used for transmitting uplink data and a downlink frequency resource used for transmitting downlink data, where the different duplex modes include a TDD mode, an FDD mode, and a full-duplex mode; and sends downlink data to UE by using the configured downlink frequency resource, and receives, by using the configured uplink frequency resource, uplink data sent by the UE. The eNodeB separately configures, in different time units on a specific frequency band according to different duplex modes, an uplink frequency resource for transmitting uplink data and a downlink frequency resource for transmitting downlink data, so that an uplink frequency resource and a downlink frequency resource are configured in different time units on a same frequency band according to a variety of duplex modes. In this way, in a high-frequency and large-bandwidth case, an uplink frequency resource and a downlink frequency resource in different time units on a same frequency band are flexibly adjusted to meet an uplink and downlink service data need, and utilization of a system frequency resource is effectively improved.

The following describes the embodiments of the present invention in detail with reference to accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
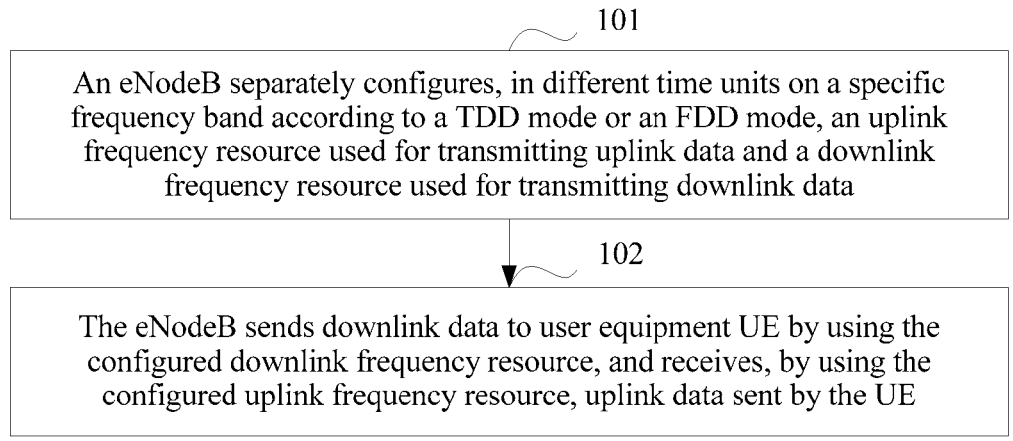
FIG. 1 is a schematic flowchart of a data transmission method according to Embodiment 1 of the present invention.

As shown in FIG. 1, FIG. 1 is a schematic flowchart of a data transmission method according to Embodiment 1 of the present invention. The method may be described as follows:

Step 101: An eNodeB separately configures, in different time units on a specific frequency band according to different duplex modes, an uplink frequency resource used for transmitting uplink data and a downlink frequency resource used for transmitting downlink data.

The different duplex modes include a TDD mode, an FDD mode, and a full-duplex mode.

In step 101, to improve resource utilization, the eNodeB configures, in different time units on the specific frequency band according to different duplex modes, the uplink frequency resource used for transmitting uplink data and a downlink spectrum resource used for transmitting downlink data.

Specifically, the eNodeB determines, on the specific frequency band, a duplex mode for transmitting data on each time unit. If it is determined that a duplex mode for transmitting data in a time unit is a TDD mode, the eNodeB configures, in the TDD mode, an uplink frequency resource used for transmitting uplink data in the time unit and a downlink frequency resource used for transmitting downlink data in the time unit. If it is determined that a duplex mode for transmitting data in a time unit is an FDD mode, the eNodeB configures, in the FDD mode, an uplink frequency resource used for transmitting uplink data in the time unit and a downlink frequency resource used for transmitting downlink data in the time unit. If it is determined that a duplex mode for transmitting data in a time unit is a full-duplex mode, the eNodeB configures, in the full-duplex mode, an uplink frequency resource used for transmitting uplink data in the time unit and a downlink frequency resource used for transmitting downlink data in the time unit.

For example, the specific frequency band is 698-803 MHz, 2300-2400 MHz, 2500-2600 MHz, or the like.

It should be noted that the specific frequency band is a continuous spectrum resource.

It is assumed that the specific frequency band is 698-803 MHz. If it is determined that a duplex mode used in a first time unit is a TDD mode, the eNodeB configures, in the TDD mode, an uplink frequency resource used for transmitting uplink data and a downlink frequency resource used for transmitting downlink data. That is, in the first time unit, either uplink data or downlink data is transmitted on 698-803 MHz. If it is determined that a duplex mode used in a second time unit is an FDD mode, the eNodeB configures, in the FDD mode, an uplink frequency resource used for transmitting uplink data and a downlink frequency resource used for transmitting downlink data. That is, in the second time unit, on 698-803 MHz, a part of frequency resource is an uplink frequency resource used for transmitting uplink data. For example, 698-732 MHz is an uplink frequency resource used for transmitting uplink data. The remaining part is a downlink frequency resource used for transmitting downlink data. For example, 735-803 MHz is a downlink frequency resource used for transmitting downlink data.

It should be noted that 733-734 MHz is a guard period (GP) that effectively prevents interference being generated in a process of transmitting uplink data and downlink data.

That is, that an eNodeB separately configures, in different time units on a specific frequency band according to different duplex modes, an uplink frequency resource used for transmitting uplink data and a downlink frequency resource used for transmitting downlink data includes:

the eNodeB configures the specific frequency band as the uplink frequency resource or configures the specific frequency band as the downlink frequency resource in a first time unit according to a TDD mode;

the eNodeB configures a first frequency resource on the specific frequency band as the uplink frequency resource and configures a second frequency resource on the specific frequency band as the downlink frequency resource in a second time unit according to an FDD mode, where the first frequency resource and the second frequency resource do not overlap;

the eNodeB configures the first frequency resource on the specific frequency band as the uplink frequency resource and configures the second frequency resource on the specific frequency band as the downlink frequency resource in a third time unit according to an FDD mode, and configures a third frequency resource on the specific frequency band as both the uplink frequency resource and the downlink frequency resource in the third time unit according to a full-duplex mode, where the first frequency resource, the second frequency resource, and the third frequency resource do not overlap with each other; or the third frequency resource and the first frequency resource and/or the second frequency resource completely or partially overlap; and the eNodeB configures the specific frequency band as both the uplink frequency resource and the downlink frequency resource in a fourth time unit according to a full-duplex mode.

Herein, it should be noted that "first", "second", "third", and "fourth" in the first time unit, the second time unit, the third time unit, and the fourth time unit are used only to distinguish between different time units, and are not intended to limit a quantity of time units.

"First", "second", and "third" in the first frequency resource, the second frequency resource, and the third frequency resource are used only to distinguish between frequency resources on different frequency bands, and are not intended to limit a quantity of frequency resources, either.

Figure 2A:
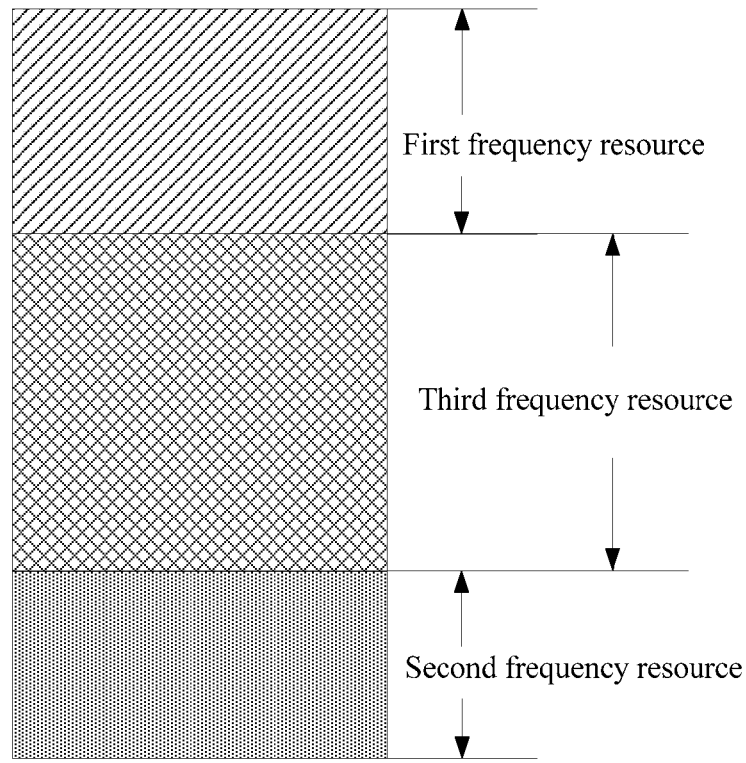
FIG. 2(a) is a schematic diagram of an uplink frequency resource and a downlink frequency resource that are configured by an eNodeB.

For example, in a time unit, a specific frequency band is divided into three frequency resources: a first frequency resource, a second frequency resource, and a third frequency resource, and the first frequency resource, the second frequency resource, and the third frequency resource do not overlap with each other. The first frequency resource on the specific frequency band is configured as an uplink frequency resource according to an FDD mode. The second frequency resource on the specific frequency band is configured as a downlink frequency resource according to an FDD mode. The third frequency resource on the specific frequency band is configured as both the uplink frequency resource and the downlink frequency resource according to a full-duplex mode. As shown in FIG. 2(a), FIG. 2(a) is a schematic diagram of the uplink frequency resource and the downlink frequency resource that are configured by an eNodeB.

Figure 2B:
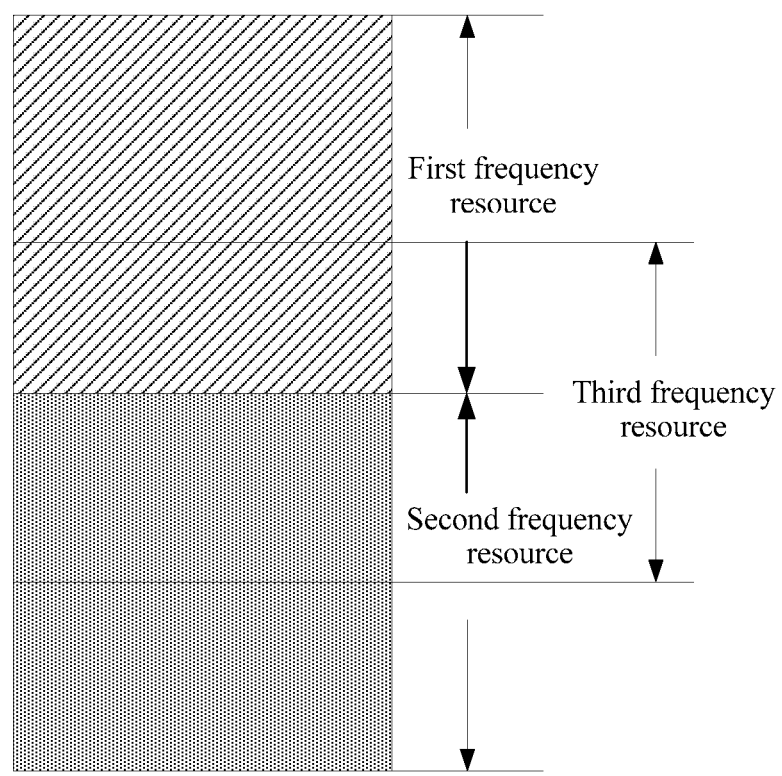
FIG. 2(b) is a schematic diagram of configuring a third frequency resource on a specific frequency band by an eNodeB as both the uplink frequency resource and a downlink frequency resource in a full-duplex mode.

In a time unit, for a specific frequency band, a first frequency resource on the specific frequency band is configured as an uplink frequency resource according to an FDD mode; in addition, a part of the first frequency resource is configured as a downlink frequency resource (in this case, the part that is of the first frequency resource and that can be used for transmitting both uplink data and downlink data is referred to as a third frequency resource) according to a full-duplex mode, so that the part of the first frequency resource can be used for transmitting both uplink data and downlink data; and/or a second frequency resource on the specific frequency band is configured as a downlink frequency resource according to an FDD mode; in addition, a part of the second frequency resource is configured as an uplink frequency resource (in this case, the part that is of the second frequency resource and that can be used for transmitting both uplink data and downlink data is referred to as a third frequency resource) according to a full-duplex mode, so that the part of the second frequency resource can be used for transmitting both uplink data and downlink data. As shown in FIG. 2(b), FIG. 2(b) is a schematic diagram of configuring a third frequency resource on the specific frequency band by an eNodeB as both the uplink frequency resource and the downlink frequency resource according to a full-duplex mode.

It should be noted that configuring a part of the first frequency resource as a downlink frequency resource may be configuring all of the first frequency resource as a downlink frequency resource. Likewise, configuring a part of the second frequency resource as an uplink frequency resource may be configuring all of the second frequency resource as an uplink frequency resource.

Herein, it should be further noted that, regardless of which duplex mode is used, a guard period (English: Guard Perido, GP for short) exists between an uplink frequency resource and a downlink frequency resource. A bandwidth occupied by the GP may be determined according to an actual need, and a manner of determining is not specifically limited herein.

Further, the uplink frequency resource and the downlink frequency resource that are configured by the eNodeB in different time units according to an FDD mode are changeable.

That is, configuration information of the uplink frequency resource and configuration information of the downlink frequency resource configured by the eNodeB in different time units according to an FDD mode are changeable.

The configuration information includes at least one of a resource location or a bandwidth occupied by a resource.

For example, in a time unit, an f1-f2 frequency band in a specific frequency band a is configured as an uplink frequency resource. In another time unit, the f1-f2 frequency band in the specific frequency band a may be configured as a downlink frequency resource.

Specifically, the uplink frequency resource and the downlink frequency resource that are configured by the eNodeB in different time units according to an FDD mode meet at least one of the following cases:

A first case:

the uplink frequency resource/the downlink frequency resource configured by the eNodeB in a time unit on the specific frequency band according to an FDD mode meets discrete distribution.

Optionally, if the uplink frequency resource and the downlink frequency resource that are configured by the eNodeB in a time unit according to an FDD mode meet discrete distribution, the uplink frequency resource and the downlink frequency resource meet equal-interval distribution.

Specifically, the uplink frequency resource configured by the eNodeB in a time unit according to an FDD mode meets discrete distribution.

This means that the downlink frequency resource configured by the eNodeB in a time unit according to an FDD mode also meets discrete distribution.

For example, the specific frequency band is 698-803 MHz, and the uplink frequency resource and the downlink frequency resource that are configured in an FDD mode meet discrete distribution. 698-700 MHz is an uplink frequency resource, 701-703 MHz is a downlink frequency resource, 704-710 MHz is an uplink frequency resource, 715-730 MHz is a downlink frequency resource, . . . , and 769-803 MHz is an uplink frequency resource.

A characteristic of discrete distribution is as follows: Bandwidths occupied by multiple subbands that are uplink frequency resources/downlink frequency resources may be the same, or may be different. However, a subband that is an uplink frequency resource and a subband that is a downlink frequency resource are alternately distributed.

Figure 3A:
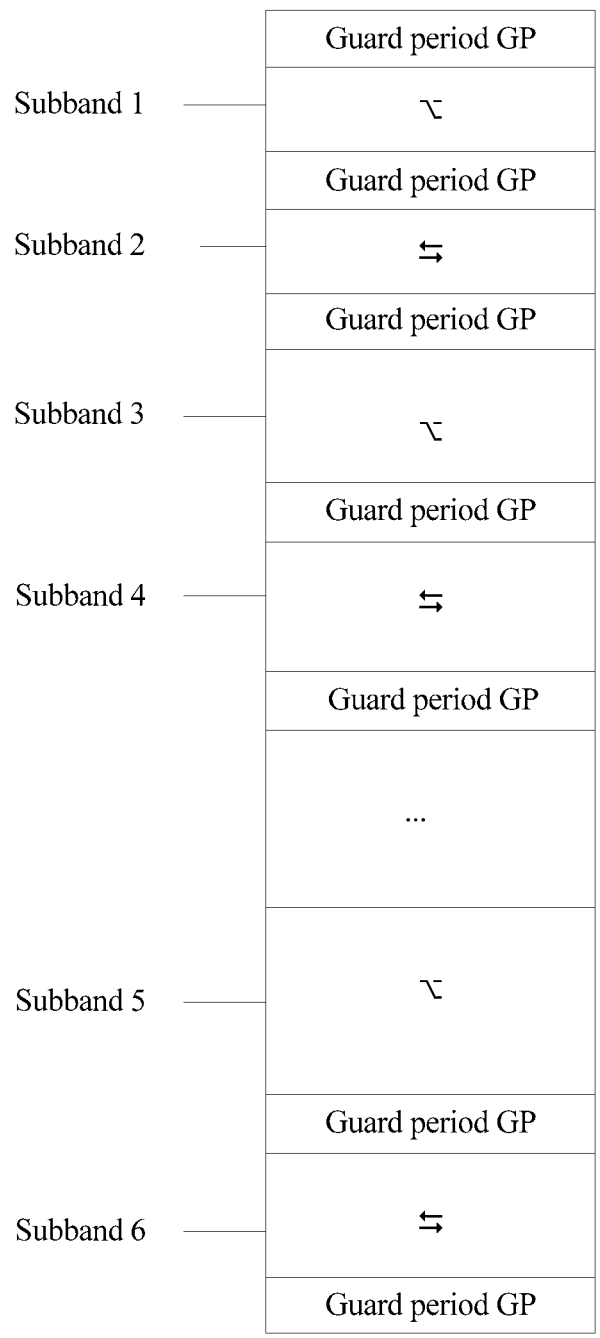
FIG. 3(a) is a schematic diagram in which an uplink frequency resource/the downlink frequency resource configured by an eNodeB in a time unit according to an FDD mode meets discrete distribution.

As shown in FIG. 3(a), FIG. 3(a) is a schematic diagram in which the uplink frequency resource/the downlink frequency resource configured by an eNodeB in a time unit according to an FDD mode meets discrete distribution.

It may be learned from FIG. 3(a) that a specific frequency band is divided into a first subband and a second subband. A GP exists between the first subband and the second subband, and the first subband and the second subband are alternately distributed.

When the first subband is used as an uplink frequency resource, the second subband is used as a downlink frequency resource. When the first subband is used as a downlink frequency resource, the second subband is used as an uplink frequency resource.

Herein, it should be noted that the first subband/the second subband may be a subband set that includes multiple subbands. A bandwidth occupied by each subband may be the same, or may be different. As shown in FIG. 3(a), some of bandwidths occupied by multiple subbands included in the first subband/the second subband are the same, and some are different.

That is, it may be learned from FIG. 3(a) that a subband 1, a subband 3, and a subband 5 belong to the first subband. However, a bandwidth occupied by the subband 1, a bandwidth occupied by the subband 3, and a bandwidth occupied by the subband 5 may be the same, or may be different. Alternatively, any two of the bandwidth occupied by the subband 1, the bandwidth occupied by the subband 3, and the bandwidth occupied by the subband 5 are the same, and this is not limited herein. A subband 2, a subband 4, and a subband 6 belong to the second subband. However, a bandwidth occupied by the subband 2, a bandwidth occupied by the subband 4, and a bandwidth occupied by the subband 6 may be the same, or may be different. Alternatively, any two of the bandwidth occupied by the subband 2, the bandwidth occupied by the subband 4, and the bandwidth occupied by the subband 6 are the same, and this is not limited herein.

Herein, it should be noted that some or all of the bandwidth occupied by the subband 1, the bandwidth occupied by the subband 3, the bandwidth occupied by the subband 5, the bandwidth occupied by the subband 2, the bandwidth occupied by the subband 4, and the bandwidth occupied by the subband 6 may be the same, or may be different, and this is not limited herein.

Optionally, the uplink frequency resource configured by the eNodeB in a time unit according to an FDD mode meets equal-interval distribution.

This means that bandwidths of the downlink frequency resource configured by the eNodeB in a time unit according to an FDD mode are a same bandwidth.

Figure 3B:
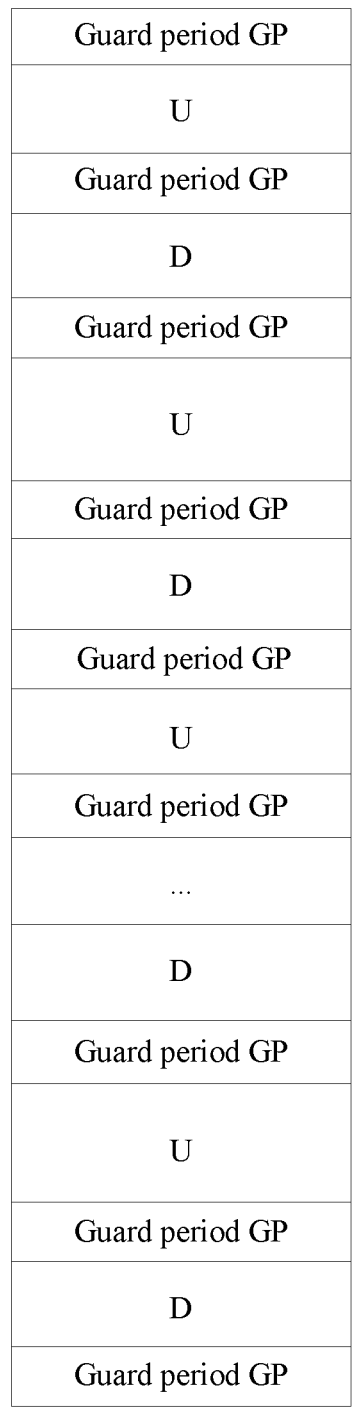
FIG. 3(b) is a schematic diagram in which an uplink frequency resource configured by an eNodeB in a time unit according to an FDD mode meets equal-interval distribution.

As shown in FIG. 3(b), FIG. 3(b) is a schematic diagram in which the uplink frequency resource configured by the eNodeB in a time unit according to an FDD mode meets equal-interval distribution.

Alternatively, the downlink frequency resource configured by the eNodeB in a time unit according to an FDD mode meets equal-interval distribution.

This means that bandwidths of the uplink frequency resource configured by the eNodeB in a time unit according to an FDD mode are a same bandwidth.

As shown in FIG. 3(c), FIG. 3(c) is a schematic diagram in which the downlink frequency resource configured by the eNodeB in a time unit according to an FDD mode meets equal-interval distribution.

For example, the specific frequency band is 698-803 MHz. That the uplink frequency resource and the downlink frequency resource that are configured in an FDD mode meet equal-interval distribution is as follows: 698-700 MHz is an uplink frequency resource, 701-703 MHz is a downlink frequency resource, 704-706 MHz is an uplink frequency resource, . . . , and 801-803 MHz is a downlink frequency resource.

A characteristic of equal-interval distribution is as follows: Bandwidths occupied by multiple subbands that are uplink frequency resources are the same, bandwidths occupied by multiple subbands that are downlink frequency resources are the same, and the uplink frequency resource and the downlink frequency resource are alternately distributed.

Whether the bandwidths occupied by the multiple subbands that are uplink frequency resources and the bandwidths occupied by the multiple subbands that are downlink frequency resources are the same is not limited, that is, they may be the same, or may be different.

Optionally, the uplink frequency resource/the downlink frequency resource configured by the eNodeB in a time unit according to an FDD mode meets discrete distribution, and the uplink frequency resource and the downlink frequency resource meet equal-interval distribution.

As shown in FIG. 3(d), FIG. 3(d) is a schematic diagram in which the uplink frequency resource/the downlink frequency resource configured by the eNodeB in a time unit according to an FDD mode meets discrete distribution, and the uplink frequency resource and the downlink frequency resource meet equal-interval distribution.

Herein, it should be noted that, a bandwidth occupied by a subband corresponding to an uplink frequency resource/a downlink frequency resource may be determined according to an amount of uplink and downlink service data processed by the eNodeB, or may be determined in another manner. A manner of determining is not limited herein.

Herein, it should be further noted that if the uplink frequency resource/the downlink frequency resource configured by the eNodeB in an FDD mode meets discrete distribution, and/or the uplink frequency resource and the downlink frequency resource that are configured in an FDD mode meet equal-interval distribution, the uplink frequency resource is used for sending an uplink measurement pilot signal.

A second case:
The uplink frequency resource configured by the eNodeB in a time unit on the specific frequency band according to an FDD mode is distributed on two sidebands in the specific frequency band.

The two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths.

It should be noted that the two sidebands are generally a sideband corresponding to a lowest frequency band in the specific frequency band and a sideband corresponding to a highest frequency band in the specific frequency band.

A bandwidth occupied by a sideband may be determined according to a need, and is not limited herein.

Figure 4:
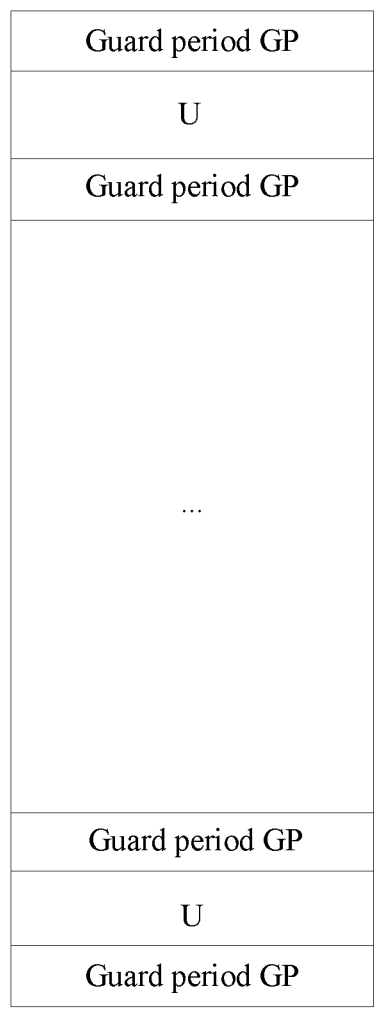
FIG. 4 is a schematic diagram in which an uplink frequency resource configured by an eNodeB in a time unit according to an FDD mode is distributed on two sidebands in the specific frequency band.

As shown in FIG. 4, FIG. 4 is a schematic diagram in which the uplink frequency resource configured by an eNodeB in a time unit according to an FDD mode is distributed on two sidebands in the specific frequency band.

It may be learned from FIG. 4 that the two sidebands in the specific frequency band are configured as uplink frequency resources in a time unit according to an FDD mode. A frequency band other than the two sidebands is configured as an uplink frequency resource and/or a downlink frequency resource and a GP, and this is not limited herein.

Herein, it should be noted that if the uplink frequency resource configured by the eNodeB in an FDD mode is distributed on the two sidebands in the specific frequency band, the uplink frequency resource is used for sending a hybrid automatic repeat request (English: Hybrid Automatic Repeat Request, HARQ for short) signal.

A third case:
The downlink frequency resource configured by the eNodeB in a time unit on the specific frequency band according to an FDD mode is distributed on a third subband that is centered on a center carrier of the specific frequency band and that is distributed symmetrically and continuously.

A bandwidth occupied by the third subband is less than a total available bandwidth of the specific frequency band.

Figure 5:
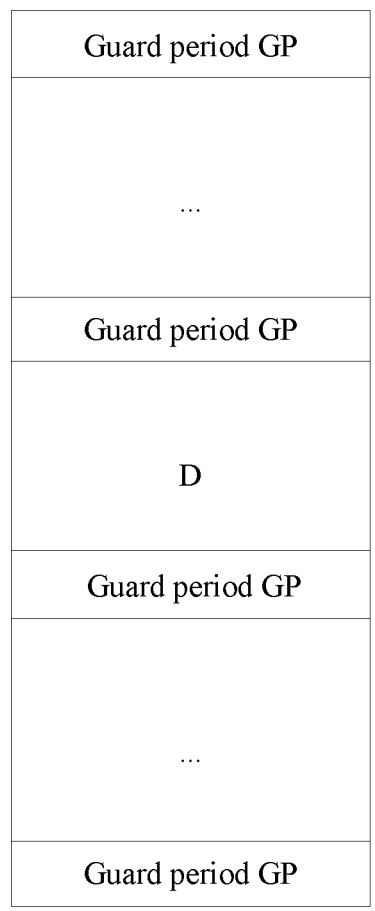
FIG. 5 is a schematic diagram in which an downlink frequency resource configured by an eNodeB in a time unit according to an FDD mode is on a third subband that is centered on a center carrier of a specific frequency band and that is distributed symmetrically and continuously.

As shown in FIG. 5, FIG. 5 is a schematic diagram in which the downlink frequency resource configured by an eNodeB in a time unit according to an FDD mode is on a third subband that is centered on a center carrier of the specific frequency band and that is distributed symmetrically and continuously.

It may be learned from FIG. 5 that the third subband that is centered on the center carrier of the specific frequency band and that is distributed symmetrically and continuously is configured as a downlink frequency resource in a time unit according to an FDD mode. Another frequency band resource other than the third subband is configured as an uplink frequency resource and/or a downlink frequency resource, and this is not limited herein.

Optionally, with reference to FIG. 4 and FIG. 5, the uplink frequency resource configured by the eNodeB in a time unit according to an FDD mode is distributed on the two sidebands in the specific frequency band, and the configured downlink frequency resource uses the center carrier of the specific frequency band as a center and is distributed symmetrically and continuously.

Herein, it should be noted that if the downlink frequency resource configured by the eNodeB in an FDD mode is distributed on the third subband that is centered on the center carrier of the specific frequency band and that is distributed symmetrically and continuously, the downlink frequency resource is used for sending a synchronization signal or a broadcast signal.

A fourth case:
The uplink frequency resource configured by the eNodeB in a time unit on the specific frequency band according to an FDD mode is distributed on a fourth subband that is centered on a center carrier of the specific frequency band and that is distributed symmetrically and continuously.

A bandwidth occupied by the fourth subband is less than a total available bandwidth of the specific frequency band.

Figure 6:
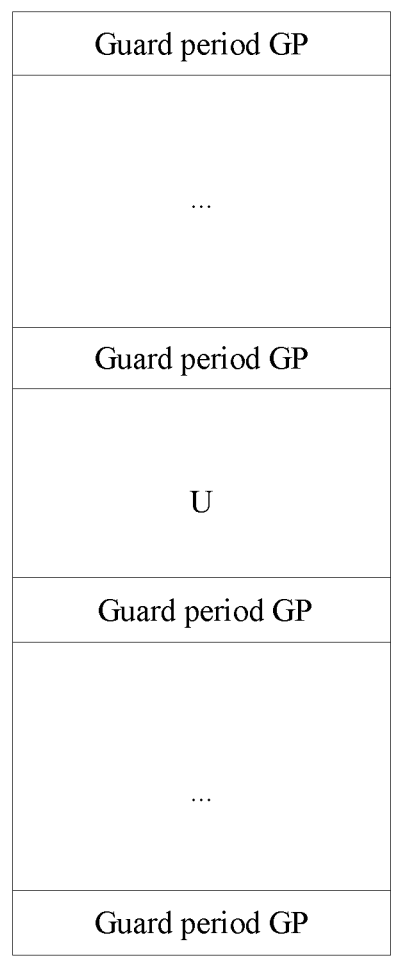
FIG. 6 is a schematic diagram in which an uplink frequency resource configured by an eNodeB in a time unit according to an FDD mode is distributed on a fourth subband that is centered on a center carrier of a specific frequency band and that is distributed symmetrically and continuously.

As shown in FIG. 6, FIG. 6 is a schematic diagram in which the uplink frequency resource configured by an eNodeB in a time unit according to an FDD mode is distributed on a fourth subband that is centered on a center carrier of the specific frequency band and that is distributed symmetrically and continuously.

It may be learned from FIG. 6 that the fourth subband that is centered on the center carrier of the specific frequency band and that is distributed symmetrically and continuously is configured as an uplink frequency resource in a time unit according to an FDD mode. Another frequency band other than the fourth subband is configured as an uplink frequency resource and/or a downlink frequency resource, and this is not limited herein.

Herein, it should be noted that if the uplink frequency resource configured by the eNodeB in an FDD mode is distributed on the fourth subband that is centered on the center carrier of the specific frequency band and that is distributed symmetrically and continuously, the uplink frequency resource is used for sending a random access channel.

A fifth case:

The uplink frequency resource/the downlink frequency resource configured by the eNodeB in a time unit according to an FDD mode is continuously distributed.

Figure 7:
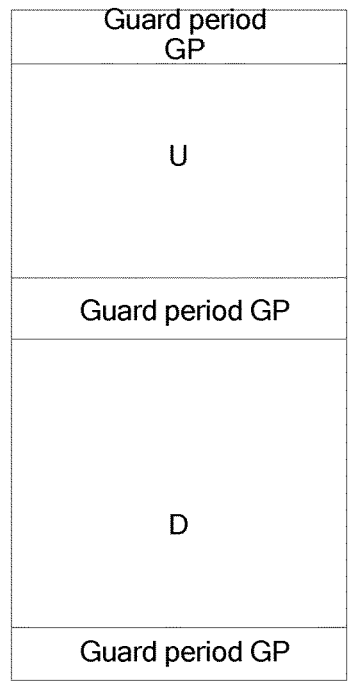
FIG. 7 is a schematic diagram in which the uplink frequency resource/the downlink frequency resource configured by an eNodeB in a time unit according to an FDD mode is continuously distributed.

As shown in FIG. 7, FIG. 7 is a schematic diagram in which the uplink frequency resource/the downlink frequency resource configured by an eNodeB in a time unit according to an FDD mode is continuously distributed.

It may be learned from FIG. 7 that the specific frequency band is divided into three parts in a time unit according to an FDD mode. The first part is used as an uplink frequency resource, the second part is a GP, and the third part is used as a downlink frequency resource.

Optionally, if the uplink frequency resource/the downlink frequency resource configured by the eNodeB in a time unit according to an FDD mode is continuously distributed, a proportion of the configured uplink frequency resource to the configured downlink frequency resource is changeable.

For example, as shown in Table 1, Table 1 is a schematic table of the proportion of the configured uplink frequency resource to the configured downlink frequency resource.

TABLE 1

| Configuration number | Bandwidth occupied by a downlink frequency resource | Bandwidth occupied by a GP | Bandwidth occupied by an uplink frequency resource |
| --- | --- | --- | --- |
| 0 | 4 | 1 | 2 |
| 1 | 3 | 2 | 1 |
| 2 | 2 | 1 | 4 |
| 3 | 1 | 1 | 5 |
| 4 | 1 | 2 | 4 |

It may be learned from Table 1 that a proportion of the bandwidth occupied by the configured uplink frequency resource to the bandwidth occupied by the downlink frequency resource may be 2:4, 1:3, 4:2, 5:1, 4:1, or the like.

Figure 8:
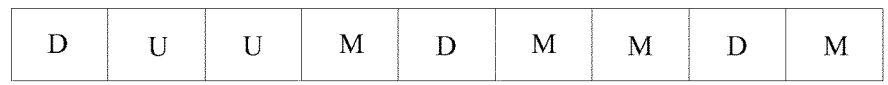
FIG. 8 is a schematic diagram of separately configuring, by an eNodeB in different time units according to different duplex modes, an uplink frequency resource used for transmitting uplink data and a downlink frequency resource used for transmitting downlink data.

In conclusion, that the eNodeB separately configures, in different time units on the specific frequency band according to different duplex modes, an uplink frequency resource used for transmitting uplink data and a downlink frequency resource used for transmitting downlink data may be shown in FIG. 8.

Specifically, it may be learned from FIG. 8 that, in some time units, the specific frequency band (for example, denoted as "U") is used as an uplink frequency resource, and is used for transmitting uplink service data; in some time units, the specific frequency band (for example, denoted as "D") is used as a downlink frequency resource, and is used for transmitting downlink service data; in some time units, the specific frequency band (for example, denoted as "M") is configured as an uplink frequency resource and a downlink frequency resource based on the foregoing described five configuration cases.

Specifically, denoting the specific frequency band as "U" means that the specific frequency band in the time unit is dedicatedly used for transmitting uplink service data. Denoting the specific frequency band as "D" means that the specific frequency band in the time unit is dedicatedly used for transmitting downlink service data. Denoting the specific frequency band as "M" means that a part of the specific frequency band in the time unit is used for transmitting uplink service data, a part of the specific frequency band is used for transmitting downlink service data, and a frequency band used for transmitting uplink service data and a frequency band used for transmitting downlink service data may be different.

In this embodiment of the present invention, a related time unit includes at least one of the following:

a radio-frame-based time unit, a subframe-based time unit, a timeslot-based time unit, or a symbol-based time unit.

The radio-frame-based time unit means that duration corresponding to one radio frame is 10 ms. That is, duration corresponding to a time unit in this embodiment of the present invention may be 10 ms.

The subframe-based time unit means that one radio frame includes two half-frames (duration is 5 ms), where each half-frame includes five subframes, and duration corresponding to each subframe is 1 ms. That is, duration corresponding to a time unit in this embodiment of the present invention may be 1 ms.

The timeslot-based time unit means that one subframe includes two timeslots, duration corresponding to each timeslot is 0.5 ms. That is, duration corresponding to a time unit in this embodiment of the present invention may be 0.5 ms.

The symbol-based time unit means that one timeslot may be divided into seven time slices in a time domain, where the symbol is a time division multiplexing (English: Orthography Frequency Division Multiplexing, OFDM for short) symbol, and each time slice may be referred to as an OFDM symbol. That is, a time unit in this embodiment of the present invention may be expressed as one or more OFDM symbols.

In another embodiment of the present invention, the time unit may include the following several types: a first type of time unit, a second type of time unit, a third type of time unit, and a fourth type of time unit.

Optionally, a duplex mode for configuring an uplink frequency resource and a downlink frequency resource in the first type of time unit is unchangeable.

Figure 9:
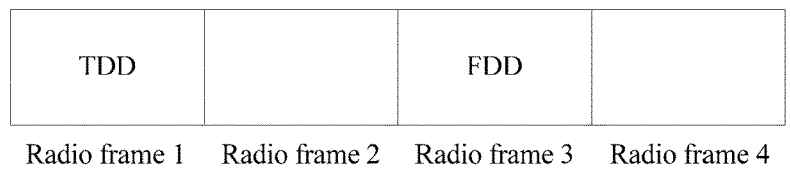
FIG. 9 is a schematic structural diagram of a duplex mode for configuring an uplink frequency resource and a downlink frequency resource in a first type of time unit.

For example, the time unit includes a radio frame 1, a radio frame 2, a radio frame 3, and a radio frame 4. The first type of time unit includes the radio frame 1 and the radio frame 3. Duplex modes for separately configuring an uplink frequency resource and a downlink frequency resource in the radio frame 1 and the radio frame 3 are unchangeable. For example, a duplex mode for configuring an uplink frequency resource and a downlink frequency resource in the radio frame 1 is always a TDD mode. A duplex mode for configuring an uplink frequency resource and a downlink frequency resource in the radio frame 3 is always an FDD mode. As shown in FIG. 9, FIG. 9 is a schematic structural diagram of a duplex mode for configuring an uplink frequency resource and a downlink frequency resource in a first type of time unit.

Optionally, a duplex mode for configuring an uplink frequency resource and a downlink frequency resource in the second type of time unit is changeable.

Figure 10:
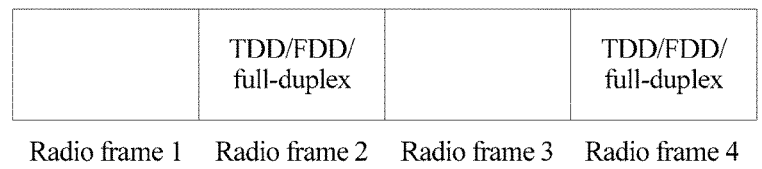
FIG. 10 is a schematic structural diagram of a duplex mode for configuring an uplink frequency resource and a downlink frequency resource in a second type of time unit.

The foregoing example is still used. The second type of time unit includes the radio frame 2 and the radio frame 4. Duplex modes for separately configuring an uplink frequency resource and a downlink frequency resource in the radio frame 2 and the radio frame 4 are flexible and changeable. The duplex modes for configuring an uplink frequency resource and a downlink frequency resource in the radio frame 2 and the radio frame 4 are determined according to a service requirement. As shown in FIG. 10, FIG. 10 is a schematic structural diagram of a duplex mode for configuring an uplink frequency resource and a downlink frequency resource in a second type of time unit.

It may be learned from FIG. 10 that the duplex modes for configuring an uplink frequency resource and a downlink frequency resource in the radio frame 2 and the radio frame 4 are flexible and changeable according to a service requirement. That is, a duplex mode for configuring an uplink frequency resource and a downlink frequency resource in the radio frame 2 may be an FDD mode, or may be a TDD mode, or may be a full-duplex mode.

Optionally, configuration information of an uplink frequency resource configured in the third type of time unit and configuration information of a downlink frequency resource configured in the third type of time unit are unchangeable.

Optionally, configuration information of an uplink frequency resource configured in the fourth type of time unit and configuration information of a downlink frequency resource configured in the fourth type of time unit are changeable.

It should be noted that the configuration information includes resource location information and a bandwidth occupied by a resource. Herein, that the configuration information is unchangeable should be understood as follows: The resource location information does not change, and the bandwidth occupied by the resource does not change. That the configuration information is changeable should be understood as follows: The resource location information is changeable, and/or the bandwidth occupied by the resource is changeable.

The resource location information herein may include location information of an uplink frequency resource, or may include location information of a downlink frequency resource. The bandwidth occupied by the resource may be a bandwidth occupied by an uplink frequency resource, or may include a bandwidth occupied by a downlink frequency resource.

If the first type of time unit includes the third type of time unit, a duplex mode for configuring an uplink frequency resource and a downlink frequency resource in the first type of time unit is unchangeable, and configuration information for configuring an uplink frequency resource and configuration information for configuring a downlink frequency resource are unchangeable.

The radio frame 1 shown in FIG. 9 is still used as an example. The radio frame 1 includes 10 subframes (subframes 0 to 9), and configuration information of an uplink frequency resource and a downlink frequency resource that are configured in some subframes of the 10 subframes included in the radio frame 1 may be unchangeable. For example, an uplink frequency resource is always configured in the subframe 1, and a downlink frequency resource is always configured in the subframe 6.

The radio frame 3 in FIG. 9 is further used as an example. The radio frame 3 includes 10 subframes (subframes 0 to 9), and configuration information of an uplink frequency resource and a downlink frequency resource that are configured in some subframes of the 10 subframes included in the radio frame 3 may be unchangeable. For example, in the subframe 3, one of the foregoing six cases in an FDD mode is always used for configuring configuration information of an uplink frequency resource and a downlink frequency resource. In the subframe 6, one of the foregoing six cases in an FDD mode is always used for configuring configuration information of an uplink frequency resource and a downlink frequency resource. A case selected for the subframe 3 and a case selected for the subframe 6 may be the same, or may be different.

Herein, that the configuration information is changeless includes: selection of a case is changeless, a location of a configured resource is changeless, and a bandwidth occupied by a resource is changeless.

Herein, it is assumed that, in the subframe 3, a resource proportion of an uplink frequency resource to a downlink frequency resource is 1:3, where the uplink frequency resource and the downlink frequency resource are always configured in an FDD mode. It is assumed that, in the subframe 6, a resource proportion of an uplink frequency resource to a downlink frequency resource is 2:4, where the uplink frequency resource and the downlink frequency resource are always configured in an FDD mode.

Figure 11A:
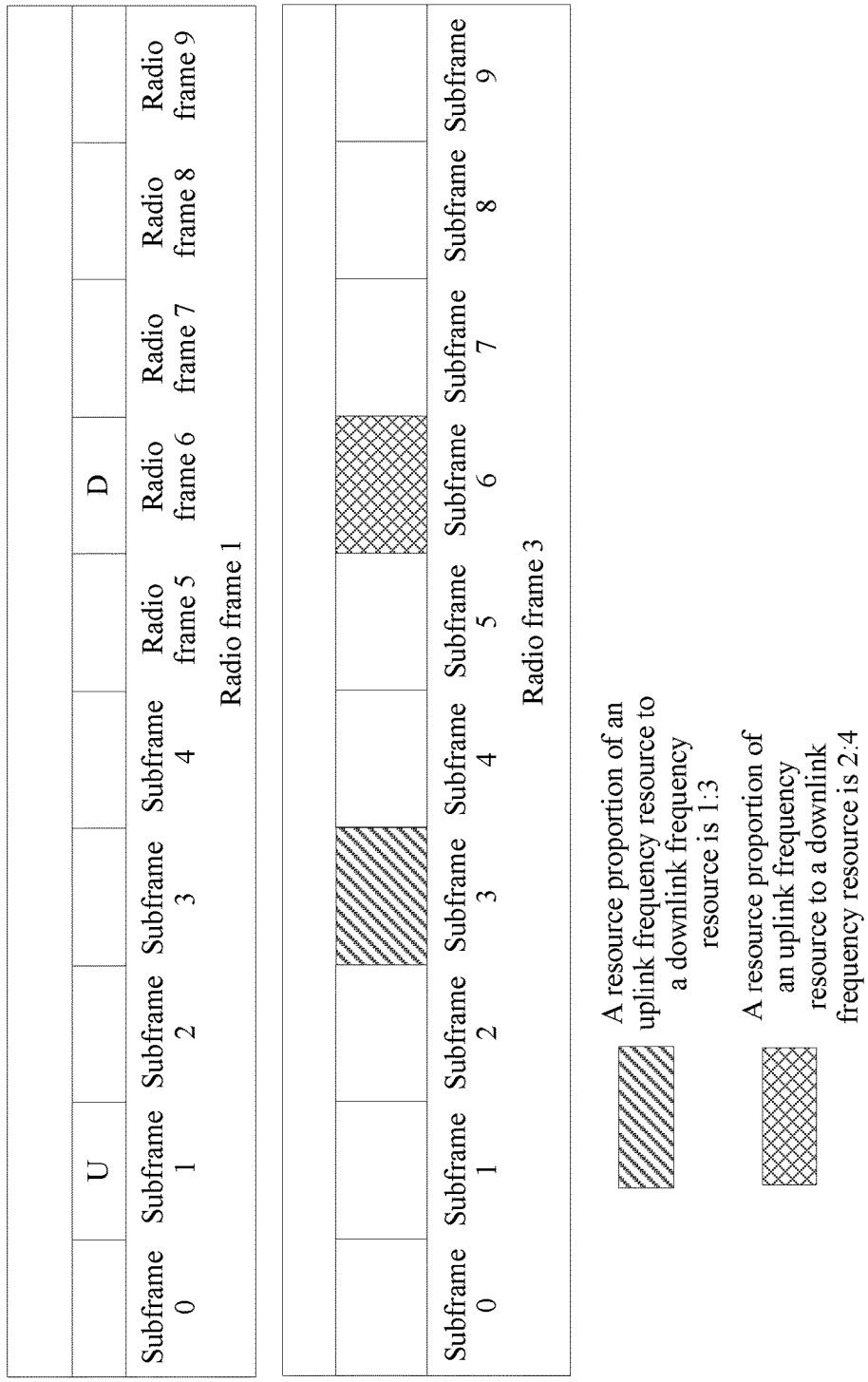
FIG. 11(a) is a schematic structural diagram of configuration information that is corresponding to each subframe in a radio frame and that is for configuring an uplink frequency resource and a downlink frequency resource.
Figure 11B:
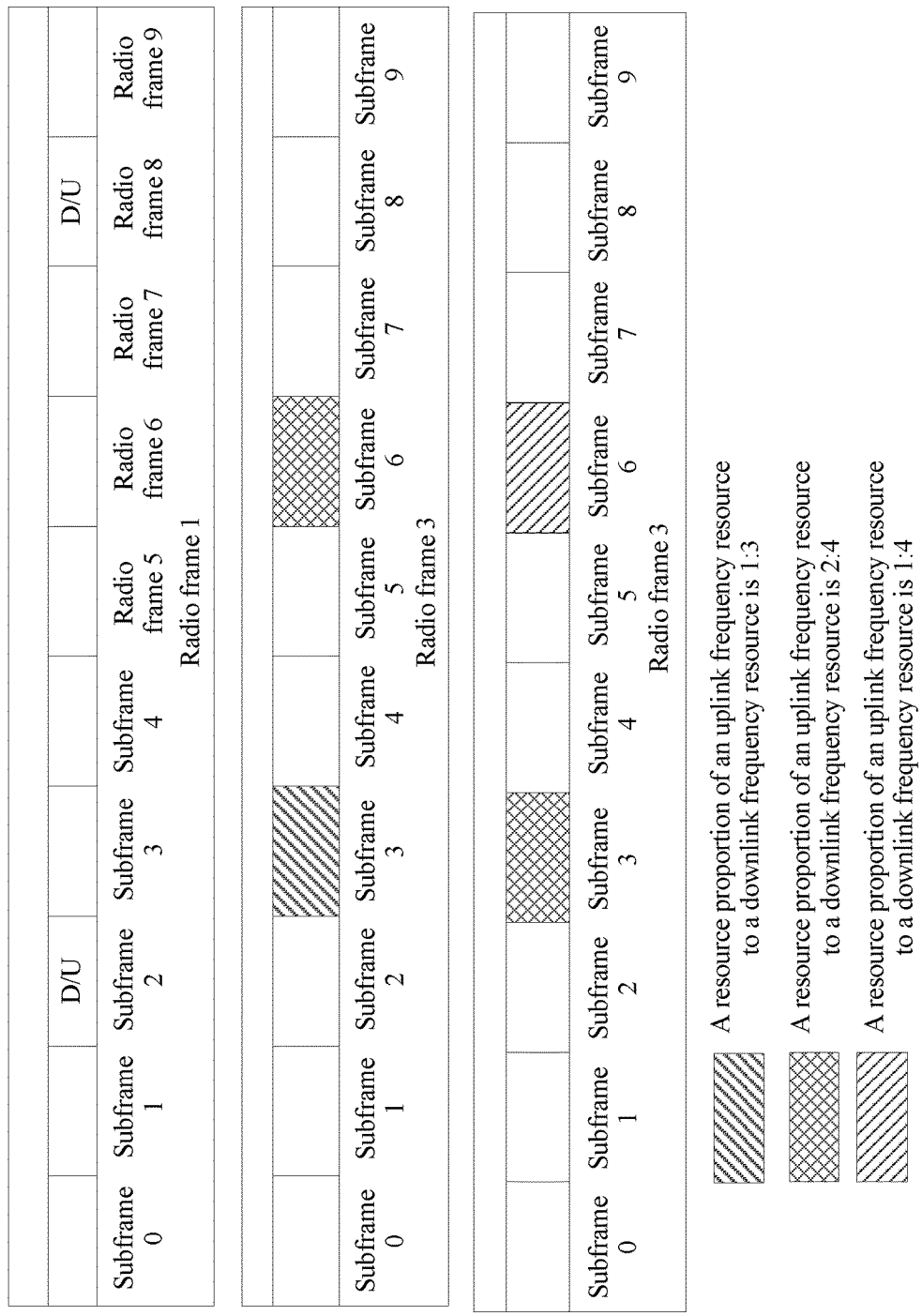
FIG. 11(b) is a schematic structural diagram of configuration information that is corresponding to each subframe in a radio frame and that is for configuring an uplink frequency resource and a downlink frequency resource.

As shown in FIG. 11(*a*), FIG. 11(*a*) is a schematic structural diagram of configuration information that is corresponding to each subframe in a radio frame and that is for configuring an uplink frequency resource and a downlink frequency resource.

If the first type of time unit further includes the fourth type of time unit, a duplex mode for configuring an uplink frequency resource and a downlink frequency resource in the first type of time unit is unchangeable, but configuration information for configuring an uplink frequency resource and configuration information for configuring a downlink frequency resource are changeable.

The radio frame 1 shown in FIG. 9 is still used as an example. The radio frame 1 includes 10 subframes (subframes 0 to 9), and configuration information of an uplink frequency resource and a downlink frequency resource that are configured in some subframes of the 10 subframes included in the radio frame 1 is changeable. For example, an uplink frequency resource (denoted as U)/a downlink frequency resource (denoted as D) is flexibly configured in the subframe 2, and an uplink frequency resource/a downlink frequency resource is flexibly configured in the subframe 8.

The radio frame 3 in FIG. 9 is further used as an example. The radio frame 3 includes 10 subframes (subframes 0 to 9), configuration information of an uplink frequency resource and a downlink frequency resource that are configured in some subframes of the 10 subframes included in the radio frame 3 is changeable. For example, in the subframe 2, one of the foregoing six cases in an FDD mode is flexibly used for configuring configuration information of an uplink frequency resource and a downlink frequency resource. In the subframe 8, one of the foregoing six cases in an FDD mode is flexibly used for configuring configuration information of an uplink frequency resource and a downlink frequency resource.

Herein, that the configuration information is flexible includes at least one of: selection of a case is flexible, a location of a configured resource is flexible, or a bandwidth occupied by a resource is flexible.

Herein, it is assumed that, in the subframe 3, a resource proportion of an uplink frequency resource to a downlink frequency resource may be 1:3, or may be 2:4, where the uplink frequency resource and the downlink frequency resource are flexibly configured in an FDD mode. It is assumed that, in the subframe 6, a resource proportion of an uplink frequency resource to a downlink frequency resource may be 2:4, or may be 1:4, where the uplink frequency resource and the downlink frequency resource are flexibly configured in an FDD mode.

As shown in FIG. 11(*b*), FIG. 11(*b*) is a schematic structural diagram of configuration information that is corresponding to each subframe in a radio frame and that is for configuring an uplink frequency resource and a downlink frequency resource.

If the second type of time unit includes the third type of time unit, a duplex mode for configuring an uplink frequency resource and a downlink frequency resource in the second type of time unit is changeable, but configuration information for configuring an uplink frequency resource and configuration information for configuring a downlink frequency resource are unchangeable.

The radio frame 2 shown in FIG. 10 is still used as an example. The radio frame 2 includes 10 subframes (subframes 0 to 9). If in the radio frame 2, a duplex mode selected for the 10 subframes included in the radio frame 2 is a TDD mode, configuration information for configuring an uplink frequency resource in the TDD mode and configuration information for configuring a downlink frequency resource in the TDD mode are unchangeable. For example, in a TDD mode, an uplink frequency resource is always configured in the subframe 1, and a downlink frequency resource is always configured in the subframe 6.

If a duplex mode selected in the radio frame 2 is an FDD mode, configuration information for configuring an uplink frequency resource in the FDD mode and configuration information for configuring a downlink frequency resource in the FDD mode are unchangeable. For example, in an FDD mode, configuration information for configuring an uplink frequency resource in the subframe 1 and configuration information for configuring a downlink frequency resource in the subframe 1 are unchangeable. For example, in the subframe 1, a proportion of a configured uplink frequency resource to a configured downlink frequency resource is always 1:3, and in the subframe 6, a proportion of a configured uplink frequency resource to a configured downlink frequency resource is always 2:4.

Figure 12A:
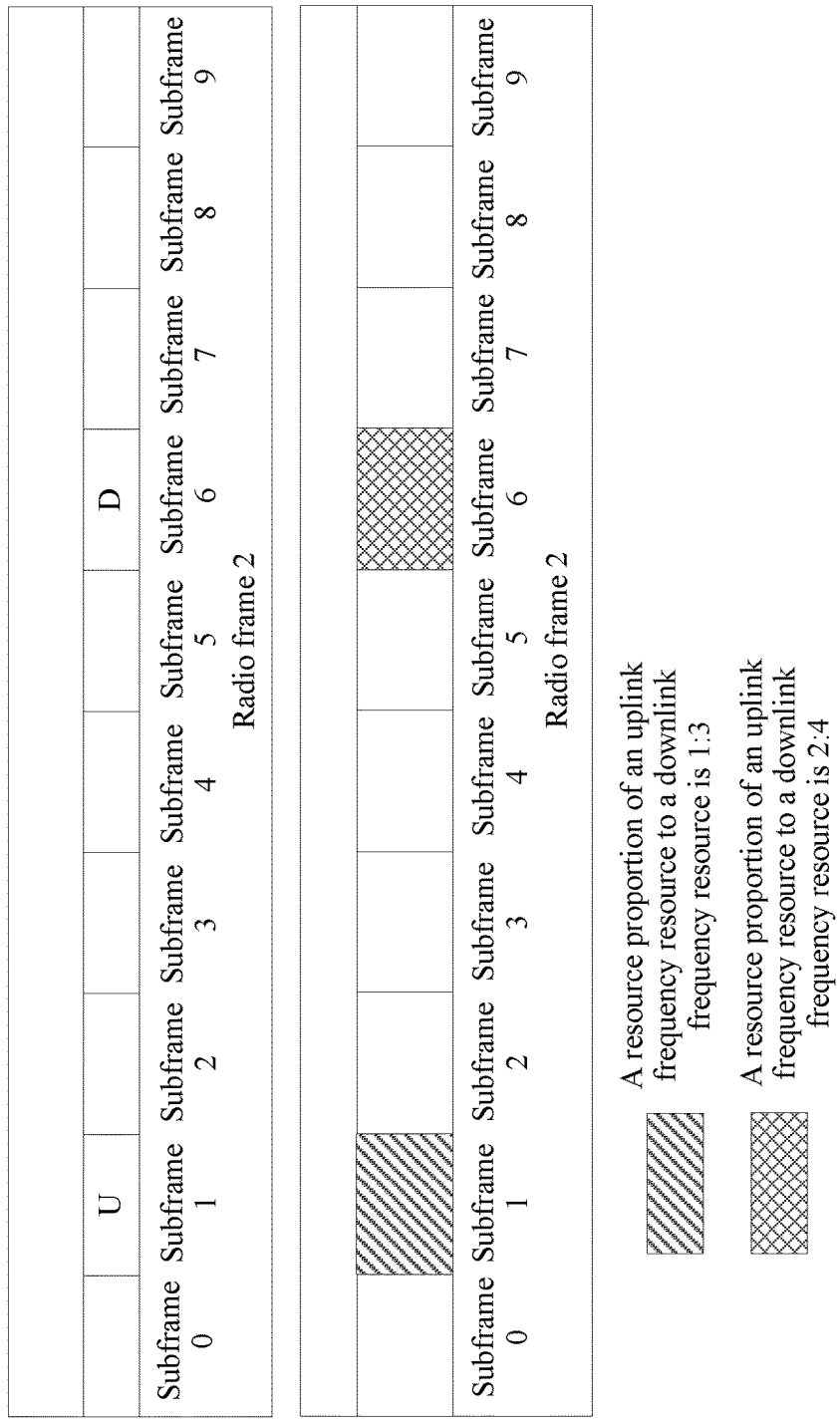
FIG. 12(a) is a schematic structural diagram of configuration information that is corresponding to each subframe in a radio frame and that is for configuring an uplink frequency resource and a downlink frequency resource.
Figure 12B:
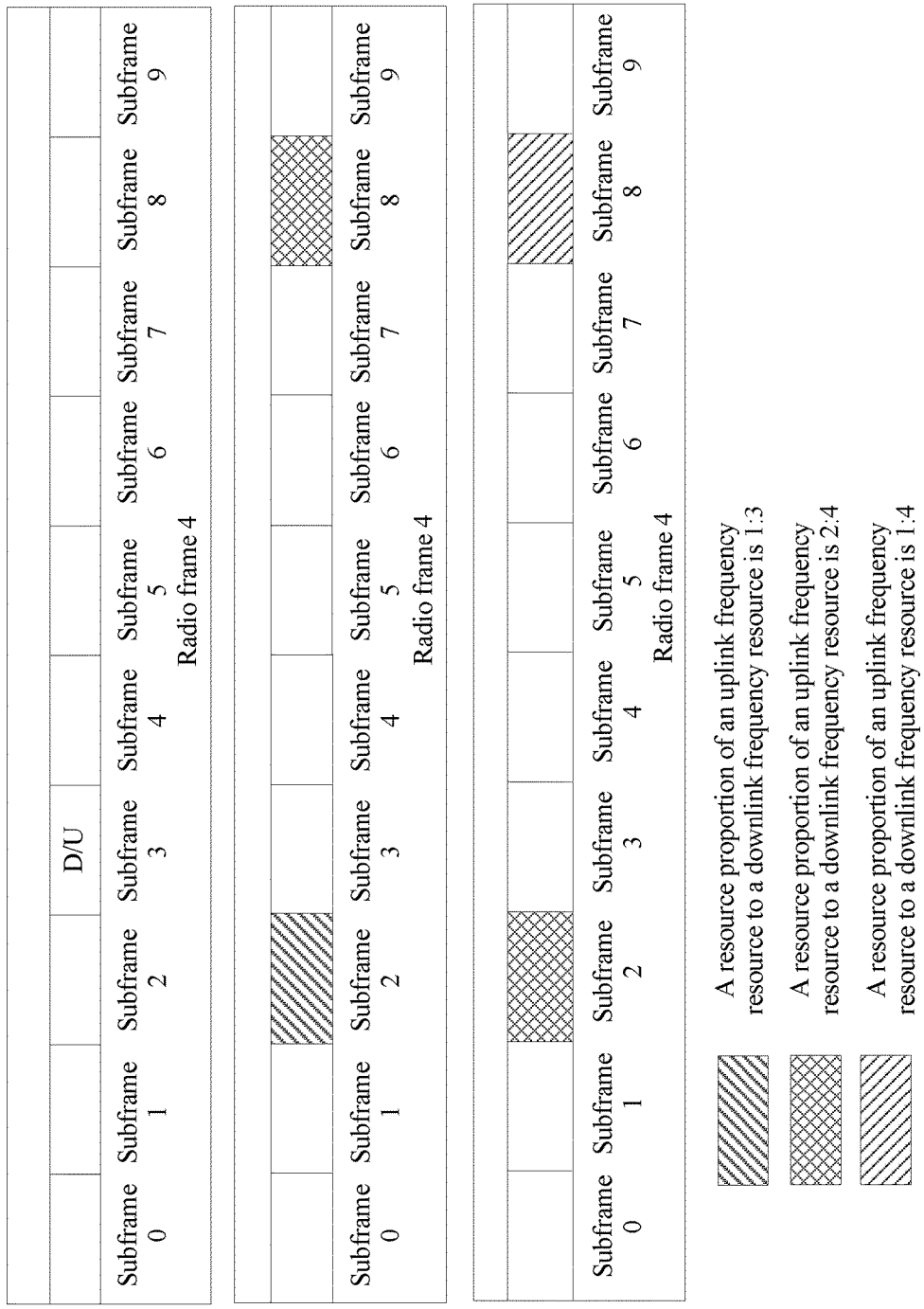
FIG. 12(b) is a schematic structural diagram of configuration information that is corresponding to each subframe in a radio frame and that is for configuring an uplink frequency resource and a downlink frequency resource.

As shown in FIG. 12(*a*), FIG. 12(*a*) is a schematic structural diagram of configuration information that is corresponding to each subframe in a radio frame and that is for configuring an uplink frequency resource and a downlink frequency resource.

If the second type of time unit further includes the fourth type of time unit, a duplex mode for configuring an uplink frequency resource and a downlink frequency resource in the second type of time unit is changeable, and configuration information for configuring an uplink frequency resource and configuration information for configuring a downlink frequency resource are changeable.

The radio frame 4 shown in FIG. 10 is used as an example. The radio frame 4 includes 10 subframes (subframes 0 to 9). If in the radio frame 4, a duplex mode selected for the 10 subframes included in the radio frame 4 is a TDD mode, configuration information for configuring an uplink frequency resource in the TDD mode and configuration information for configuring a downlink frequency resource in the TDD mode are changeable. For example, in a TDD mode, an uplink frequency resource or a downlink frequency resource may be flexibly configured in the subframe 3.

If a duplex mode selected in the radio frame 4 is an FDD mode, configuration information for configuring an uplink frequency resource in the FDD mode and configuration information for configuring a downlink frequency resource in the FDD mode are changeable. For example, in the subframe 2, one of the foregoing six cases in an FDD mode is flexibly used for configuring configuration information of an uplink frequency resource and a downlink frequency resource. In the subframe 8, one of the foregoing six cases in an FDD mode is flexibly used for configuring configuration information of an uplink frequency resource and a downlink frequency resource.

Herein, that the configuration information is flexible includes at least one of: selection of a case is flexible, a location of a configured resource is flexible, or a bandwidth occupied by a resource is flexible.

Herein, it is assumed that, in the subframe 2, a resource proportion of an uplink frequency resource to a downlink frequency resource may be 1:3, or may be 2:4, where the uplink frequency resource and the downlink frequency resource are flexibly configured in an FDD mode. It is assumed that, in the subframe 8, a resource proportion of an uplink frequency resource to a downlink frequency resource may be 2:4, or may be 1:4, where the uplink frequency resource and the downlink frequency resource are flexibly configured in an FDD mode.

As shown in FIG. 12(*b*), FIG. 12(*b*) is a schematic structural diagram of configuration information that is corresponding to each subframe in a radio frame and that is for configuring an uplink frequency resource and a downlink frequency resource.

Optionally, the first type of time unit, the second type of time unit, the third type of time unit, and the fourth type of time unit meet a time division multiplexing requirement, and the first type of time unit and the third type of time unit meet a periodic requirement.

In another embodiment of the present invention, the method further includes:

After configuring the uplink frequency resource and the downlink frequency resource, the eNodeB sends dynamic signaling to UE.

Configuration information of an uplink frequency resource in different time units and configuration information of a downlink frequency resource in different time units are indicated in the dynamic signaling, and the configuration information includes a resource location and/or a bandwidth occupied by a resource.

Herein, it should be noted that a manner of determining configuration information for configuring an uplink frequency resource and a downlink frequency resource in an FDD mode may be any one of the foregoing six cases.

In another embodiment of the present invention, the method may further include:

After configuring the uplink frequency resource and the downlink frequency resource, the eNodeB sends semi-static signaling to the UE.

Duplex modes for configuring an uplink frequency resource and a downlink frequency resource in different time units are indicated in the semi-static signaling, and the duplex modes include at least one of a TDD mode, an FDD mode, or a full-duplex mode.

In another embodiment of the present invention, the method may further include:

The eNodeB sends semi-static signaling to the UE, where the semi-static signaling is used to indicate duplex modes for configuring an uplink frequency resource and a downlink frequency resource in different time units, and the duplex modes include at least one of a TDD mode, an FDD mode, or a full-duplex mode; and the eNodeB sends dynamic signaling to the UE, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

It should be noted that the configuration information includes at least one of location information of an uplink frequency resource/a downlink frequency resource or a bandwidth occupied by an uplink frequency resource/a downlink frequency resource.

For example, the semi-static signaling is "0110". "0" indicates that a duplex mode for configuring an uplink frequency resource and a downlink frequency resource in an indicated time unit is unchangeable. "1" indicates that a duplex mode for configuring an uplink frequency resource and a downlink frequency resource in an indicated time unit is changeable.

Optionally, the dynamic signaling or the semi-static signaling further includes information about a guard period GP.

Step 102: The eNodeB sends downlink data to user equipment UE by using the configured downlink frequency resource, and receives, by using the configured uplink frequency resource, uplink data sent by the UE.

By using the solution in Embodiment 1 of the present invention, an eNodeB separately configures, in different time units on a specific frequency band according to different duplex modes, an uplink frequency resource used for transmitting uplink data and a downlink frequency resource used for transmitting downlink data, where the different duplex modes include a TDD mode, an FDD mode, and a full-duplex mode; and sends downlink data to UE by using the configured downlink frequency resource, and receives, by using the configured uplink frequency resource, uplink data sent by the UE. The eNodeB separately configures, in different time units on a specific frequency band according to different duplex modes, an uplink frequency resource for transmitting uplink data and a downlink frequency resource for transmitting downlink data, so that an uplink frequency resource and a downlink frequency resource are configured in different time units on a same frequency band according to a variety of duplex modes. In this way, in a high-frequency and large-bandwidth case, an uplink frequency resource and a downlink frequency resource in different time units on a same frequency band are flexibly adjusted to meet an uplink and downlink service data need, and utilization of a system frequency resource is effectively improved.

Embodiment 2

Figure 13:
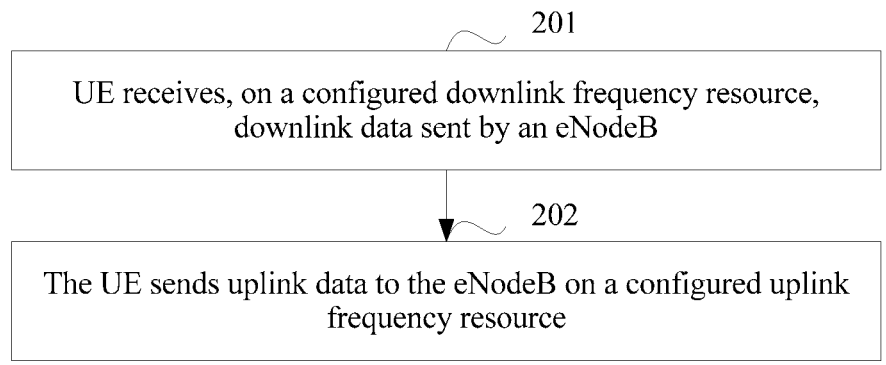
FIG. 13 is a schematic flowchart of a data transmission method according to Embodiment 2 of the present invention.

As shown in FIG. 13, FIG. 13 is a schematic flowchart of a data transmission method according to Embodiment 2 of the present invention. The method may be described as follows:

Step 201: UE receives, on a configured downlink frequency resource, downlink data sent by an eNodeB.

The configured downlink frequency resource is a downlink frequency resource that is used for transmitting downlink data and that is configured by the eNodeB in different time units on a specific frequency band according to different duplex modes, and the different duplex modes include a time division duplex TDD mode, a frequency division duplex FDD mode, and a full-duplex mode.

In another embodiment of the embodiments of the present invention, the method further includes:

The UE receives dynamic signaling sent by the eNodeB, where configuration information of an uplink frequency resource in different time units and configuration information of a downlink frequency resource in different time units are indicated in the dynamic signaling, and the configuration information includes a resource location and/or a bandwidth occupied by a resource.

In another embodiment of the embodiments of the present invention, the method further includes:

The UE receives semi-static signaling sent by the eNodeB, where duplex modes for configuring an uplink frequency resource and a downlink frequency resource in different time units are indicated in the semi-static signaling, and the duplex modes include at least one of a TDD mode, an FDD mode, or a full-duplex mode.

In another embodiment of the embodiments of the present invention, the method further includes:

The UE receives semi-static signaling sent by the eNodeB, where the semi-static signaling is used to indicate duplex modes for configuring an uplink frequency resource and a downlink frequency resource in different time units, and the duplex modes include at least one of a TDD mode, an FDD mode, or a full-duplex mode; and the UE receives dynamic signaling sent by the eNodeB, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

Step 202: The UE sends uplink data to the eNodeB on a configured uplink frequency resource.

The configured uplink frequency resource is an uplink frequency resource that is used for transmitting uplink data and that is configured by the eNodeB in different time units on the specific frequency band according to different duplex modes, and the different duplex modes include a time division duplex TDD mode, a frequency division duplex FDD mode, and a full-duplex mode.

In Embodiment 2 of the present invention, a manner for configuring an uplink frequency resource and a manner for configuring a downlink frequency resource may be implemented with reference to the manners described in Embodiment 1, and details are not described herein again.

Embodiment 3

Figure 14:
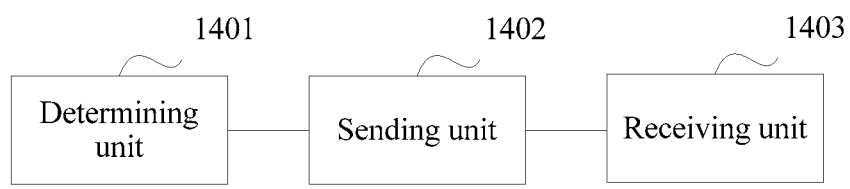
FIG. 14 is a schematic structural diagram of a data transmission device according to Embodiment 3 of the present invention.

As shown in FIG. 14, FIG. 14 is a schematic structural diagram of a data transmission device according to Embodiment 3 of the present invention. The data transmission device includes a determining unit 1401, a sending unit 1402, and a receiving unit 1403.

The determining unit 1401 is configured to separately configure, in different time units on a specific frequency band according to different duplex modes, an uplink frequency resource used for transmitting uplink data and a downlink frequency resource used for transmitting downlink data, where the different duplex modes include a time division duplex TDD mode, a frequency division duplex FDD mode, and a full-duplex mode.

The sending unit 1402 is configured to send downlink data to user equipment UE by using the configured downlink frequency resource.

The receiving unit 1403 is configured to receive, by using the configured uplink frequency resource, uplink data sent by the UE.

Specifically, the determining unit 1401 is specifically configured to: configure the specific frequency band as the uplink frequency resource or configure the specific frequency band as the downlink frequency resource in a first time unit according to a TDD mode;

configure a first frequency resource on the specific frequency band as the uplink frequency resource and configure a second frequency resource on the specific frequency band as the downlink frequency resource in a second time unit according to an FDD mode, where the first frequency resource and the second frequency resource do not overlap;

configure the first frequency resource on the specific frequency band as the uplink frequency resource and configure the second frequency resource on the specific frequency band as the downlink frequency resource in a third time unit according to an FDD mode, and configure a third frequency resource on the specific frequency band as both the uplink frequency resource and the downlink frequency resource in the third time unit according to a full-duplex mode; and configure the specific frequency band as both the uplink frequency resource and the downlink frequency resource in a fourth time unit according to a full-duplex mode.

Optionally, the uplink frequency resource and the downlink frequency resource that are configured by the determining unit 1401 in different time units according to an FDD mode are changeable.

Optionally, the uplink frequency resource and the downlink frequency resource that are configured by the determining unit 1401 in different time units according to an FDD mode meet at least one of the following cases:

The uplink frequency resource/the downlink frequency resource configured in a time unit on the specific frequency band according to an FDD mode meets discrete distribution;

the uplink frequency resource configured in a time unit on the specific frequency band according to an FDD mode is distributed on two sidebands in the specific frequency band, where the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;

the downlink frequency resource configured in a time unit on the specific frequency band according to an FDD mode is distributed on a third subband that is centered on a center carrier of the specific frequency band and that is distributed symmetrically and continuously, where a bandwidth occupied by the third subband is less than a total available bandwidth of the specific frequency band;

the uplink frequency resource configured in a time unit on the specific frequency band according to an FDD mode is distributed on a fourth subband that is centered on a center carrier of the specific frequency band and that is distributed symmetrically and continuously, where a bandwidth occupied by the fourth subband is less than a total available bandwidth of the specific frequency band; or the uplink frequency resource/the downlink frequency resource configured in a time unit according to an FDD mode is continuously distributed.

Optionally, if the uplink frequency resource and the downlink frequency resource that are configured by the determining unit 1401 in a time unit according to an FDD mode meet discrete distribution, the uplink frequency resource and the downlink frequency resource meet equal-interval distribution.

Optionally, if the uplink frequency resource/the downlink frequency resource configured by the determining unit 1401 in a time unit according to an FDD mode is continuously distributed, a proportion of the configured uplink frequency resource to the configured downlink frequency resource is changeable.

Optionally, if the uplink frequency resource/the downlink frequency resource configured in an FDD mode meets discrete distribution, and/or the uplink frequency resource and the downlink frequency resource that are configured in an FDD mode meet equal-interval distribution, the uplink frequency resource is used for sending an uplink measurement pilot signal;

if the uplink frequency resource configured in an FDD mode is distributed on two sidebands in the specific frequency band, the uplink frequency resource is used for sending a hybrid automatic repeat request HARQ signal;

if the downlink frequency resource configured in an FDD mode is distributed on the third subband that is centered on the center carrier of the specific frequency band and that is distributed symmetrically and continuously, the downlink frequency resource is used for sending a synchronization signal or a broadcast signal; and if the uplink frequency resource configured in an FDD mode is distributed on the fourth subband that is centered on the center carrier of the specific frequency band and that is distributed symmetrically and continuously, the uplink frequency resource is used for sending a random access channel.

Specifically, the determining unit 1401 is specifically configured to: determine, on the specific frequency band, a duplex mode for transmitting data in each time unit, where the duplex mode includes at least one of a TDD mode, an FDD mode, or a full-duplex mode; and for each time unit, if it is determined that a duplex mode for transmitting data in a time unit is a TDD mode, configure, in the TDD mode, an uplink frequency resource used for transmitting uplink data in the time unit and a downlink frequency resource used for transmitting downlink data in the time unit; if it is determined that a duplex mode for transmitting data in a time unit is an FDD mode, configure, in the FDD mode, an uplink frequency resource used for transmitting uplink data in the time unit and a downlink frequency resource used for transmitting downlink data in the time unit; and if it is determined that a duplex mode for transmitting data in a time unit is a full-duplex mode, configure, in the full-duplex mode, an uplink frequency resource used for transmitting uplink data in the time unit and a downlink frequency resource used for transmitting downlink data in the time unit.

Optionally, the sending unit 1402 is further configured to send dynamic signaling to the UE, where configuration information of an uplink frequency resource in different time units and configuration information of a downlink frequency resource in different time units are indicated in the dynamic signaling, and the configuration information includes a resource location and/or a bandwidth occupied by a resource.

Optionally, the sending unit 1402 is further configured to send semi-static signaling to the UE, where duplex modes for configuring an uplink frequency resource and a downlink frequency resource in different time units are indicated in the semi-static signaling, and the duplex modes include at least one of a TDD mode, an FDD mode, or a full-duplex mode.

Optionally, the sending unit 1402 is further configured to: send semi-static signaling to the UE, where the semi-static signaling is used to indicate duplex modes for configuring an uplink frequency resource and a downlink frequency resource in different time units, and the duplex modes include at least one of a TDD mode, an FDD mode, or a full-duplex mode; and send dynamic signaling to the UE, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

Optionally, the time unit includes a first type of time unit and a second type of time unit;

a duplex mode for configuring an uplink frequency resource and a downlink frequency resource in the first type of time unit is unchangeable; and a duplex mode for configuring an uplink frequency resource and a downlink frequency resource in the second type of time unit is changeable.

Optionally, the time unit includes a third type of time unit and a fourth type of time unit;

configuration information of an uplink frequency resource configured in the third type of time unit and configuration information of a downlink frequency resource configured in the third type of time unit are unchangeable; and configuration information of an uplink frequency resource configured in the fourth type of time unit and configuration information of a downlink frequency resource configured in the fourth type of time unit are changeable.

Optionally, the first type of time unit, the second type of time unit, the third type of time unit, and the fourth type of time unit meet a time division multiplexing requirement, and the first type of time unit and the third type of time unit meet a periodic requirement.

Optionally, the dynamic signaling or the semi-static signaling further includes information about a guard period GP.

Optionally, the time unit includes at least one of the following:

a radio-frame-based time unit, a subframe-based time unit, a timeslot-based time unit, or a symbol-based time unit.

Optionally, the specific frequency band is a continuous spectrum resource.

It should be noted that the data transmission device in this embodiment of the present invention may be integrated in an eNodeB, or may be independent of an eNodeB, and this is not limited herein.

Embodiment 4

Figure 15:
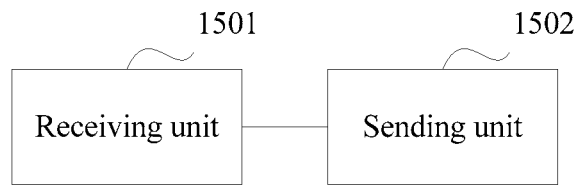
FIG. 15 is a schematic structural diagram of a data transmission device according to Embodiment 4 of the present invention.

As shown in FIG. 15, FIG. 15 is a schematic structural diagram of a data transmission device according to Embodiment 4 of the present invention. The data transmission device includes a receiving unit 1501 and a sending unit 1502.

The receiving unit 1501 is configured to receive, on a configured downlink frequency resource, downlink data sent by an eNodeB.

The sending unit 1502 is configured to send uplink data to the eNodeB on a configured uplink frequency resource.

The configured uplink frequency resource is an uplink frequency resource that is used for transmitting uplink data and that is configured by the eNodeB in different time units on a specific frequency band according to different duplex modes, the configured downlink frequency resource is a downlink frequency resource that is used for transmitting downlink data and that is configured by the eNodeB in different time units on the specific frequency band according to different duplex modes, and the different duplex modes include a time division duplex TDD mode, a frequency division duplex FDD mode, and a full-duplex mode.

Optionally, the receiving unit 1501 is further configured to receive dynamic signaling sent by the eNodeB, where configuration information of an uplink frequency resource in different time units and configuration information of a downlink frequency resource in different time units are indicated in the dynamic signaling, and the configuration information includes a resource location and/or a bandwidth occupied by a resource.

Optionally, the receiving unit 1501 is further configured to receive semi-static signaling sent by the eNodeB, where duplex modes for configuring an uplink frequency resource and a downlink frequency resource in different time units are indicated in the semi-static signaling, and the duplex modes include at least one of a TDD mode, an FDD mode, or a full-duplex mode.

Optionally, the receiving unit 1501 is further configured to: receive semi-static signaling sent by the eNodeB, where the semi-static signaling is used to indicate duplex modes for configuring an uplink frequency resource and a downlink frequency resource in different time units, and the duplex modes include at least one of a TDD mode, an FDD mode, or a full-duplex mode; and receive dynamic signaling sent by the eNodeB, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

It should be noted that the data transmission device in this embodiment of the present invention may be integrated in UE, or may be independent of UE, and this is not limited herein.

Embodiment 5

Figure 16:
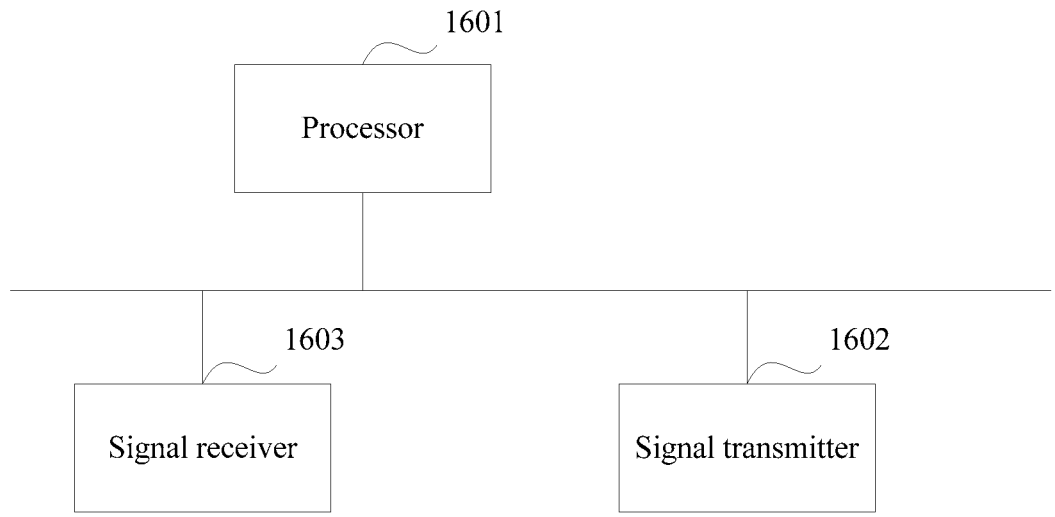
FIG. 16 is a schematic structural diagram of a data transmission device according to Embodiment 5 of the present invention.

As shown in FIG. 16, FIG. 16 is a schematic structural diagram of a data transmission device according to Embodiment 5 of the present invention. The data transmission device may include a processor 1601, a signal transmitter 1602, and a signal receiver 1603.

The processor 1601 is configured to separately configure, in different time units on a specific frequency band according to different duplex modes, an uplink frequency resource used for transmitting uplink data and a downlink frequency resource used for transmitting downlink data, where the different duplex modes include a time division duplex TDD mode, a frequency division duplex FDD mode, and a full-duplex mode.

The signal transmitter 1602 is configured to send downlink data to user equipment UE by using the configured downlink frequency resource.

The signal receiver 1603 is configured to receive, by using the configured uplink frequency resource, uplink data sent by the UE.

Optionally, the processor 1601 is specifically configured to: configure the specific frequency band as the uplink frequency resource or configure the specific frequency band as the downlink frequency resource in a first time unit according to a TDD mode;

configure a first frequency resource on the specific frequency band as the uplink frequency resource and configure a second frequency resource on the specific frequency band as the downlink frequency resource in a second time unit according to an FDD mode, where the first frequency resource and the second frequency resource do not overlap;

configure the first frequency resource on the specific frequency band as the uplink frequency resource and configure the second frequency resource on the specific frequency band as the downlink frequency resource in a third time unit according to an FDD mode, and configure a third frequency resource on the specific frequency band as both the uplink frequency resource and the downlink frequency resource in the third time unit according to a full-duplex mode; and configure the specific frequency band as both the uplink frequency resource and the downlink frequency resource in a fourth time unit according to a full-duplex mode.

Optionally, the uplink frequency resource and the downlink frequency resource that are configured by the processor 1601 in different time units according to an FDD mode are changeable.

Optionally, the uplink frequency resource and the downlink frequency resource that are configured by the processor 1601 in different time units according to an FDD mode meet at least one of the following cases:

The uplink frequency resource/the downlink frequency resource configured in a time unit on the specific frequency band according to an FDD mode meets discrete distribution;

the uplink frequency resource configured in a time unit on the specific frequency band according to an FDD mode is distributed on two sidebands in the specific frequency band, where the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;

the downlink frequency resource configured in a time unit on the specific frequency band according to an FDD mode is distributed on a third subband that is centered on a center carrier of the specific frequency band and that is distributed symmetrically and continuously, where a bandwidth occupied by the third subband is less than a total available bandwidth of the specific frequency band;

the uplink frequency resource configured in a time unit on the specific frequency band according to an FDD mode is distributed on a fourth subband that is centered on a center carrier of the specific frequency band and that is distributed symmetrically and continuously, where a bandwidth occupied by the fourth subband is less than a total available bandwidth of the specific frequency band; or the uplink frequency resource/the downlink frequency resource configured in a time unit according to an FDD mode is continuously distributed.

Optionally, if the uplink frequency resource and the downlink frequency resource that are configured by the processor 1601 in a time unit according to an FDD mode meet discrete distribution, the uplink frequency resource and the downlink frequency resource meet equal-interval distribution.

Optionally, if the uplink frequency resource/the downlink frequency resource configured by the processor 1601 in a time unit according to an FDD mode is continuously distributed, a proportion of the configured uplink frequency resource to the configured downlink frequency resource is changeable.

Optionally, if the uplink frequency resource/the downlink frequency resource configured in an FDD mode meets discrete distribution, and/or the uplink frequency resource and the downlink frequency resource that are configured in an FDD mode meet equal-interval distribution, the uplink frequency resource is used for sending an uplink measurement pilot signal;

if the uplink frequency resource configured in an FDD mode is distributed on two sidebands in the specific frequency band, the uplink frequency resource is used for sending a hybrid automatic repeat request HARQ signal;

if the downlink frequency resource configured in an FDD mode is distributed on the third subband that is centered on the center carrier of the specific frequency band and that is distributed symmetrically and continuously, the downlink frequency resource is used for sending a synchronization signal or a broadcast signal; and if the uplink frequency resource configured in an FDD mode is distributed on the fourth subband that is centered on the center carrier of the specific frequency band and that is distributed symmetrically and continuously, the uplink frequency resource is used for sending a random access channel.

Optionally, the processor 1601 is specifically configured to: determine, on the specific frequency band, a duplex mode for transmitting data in each time unit, where the duplex mode includes at least one of a TDD mode, an FDD mode, or a full-duplex mode; and for each time unit, if it is determined that a duplex mode for transmitting data in a time unit is a TDD mode, configure, in the TDD mode, an uplink frequency resource used for transmitting uplink data in the time unit and a downlink frequency resource used for transmitting downlink data in the time unit; if it is determined that a duplex mode for transmitting data in a time unit is an FDD mode, configure, in the FDD mode, an uplink frequency resource used for transmitting uplink data in the time unit and a downlink frequency resource used for transmitting downlink data in the time unit; and if it is determined that a duplex mode for transmitting data in a time unit is a full-duplex mode, configure, in the full-duplex mode, an uplink frequency resource used for transmitting uplink data in the time unit and a downlink frequency resource used for transmitting downlink data in the time unit.

Optionally, the signal transmitter 1602 is further configured to send dynamic signaling to the UE, where configuration information of an uplink frequency resource in different time units and configuration information of a downlink frequency resource in different time units are indicated in the dynamic signaling, and the configuration information includes a resource location and/or a bandwidth occupied by a resource.

Optionally, the signal transmitter 1602 is further configured to send semi-static signaling to the UE, where duplex modes for configuring an uplink frequency resource and a downlink frequency resource in different time units are indicated in the semi-static signaling, and the duplex modes include at least one of a TDD mode, an FDD mode, or a full-duplex mode.

Optionally, the signal transmitter 1602 is further configured to: send semi-static signaling to the UE, where the semi-static signaling is used to indicate duplex modes for configuring an uplink frequency resource and a downlink frequency resource in different time units, and the duplex modes include at least one of a TDD mode, an FDD mode, or a full-duplex mode; and send dynamic signaling to the UE, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

Optionally, the time unit includes a first type of time unit and a second type of time unit;

a duplex mode for configuring an uplink frequency resource and a downlink frequency resource in the first type of time unit is unchangeable; and a duplex mode for configuring an uplink frequency resource and a downlink frequency resource in the second type of time unit is changeable.

Optionally, the time unit includes a third type of time unit and a fourth type of time unit;

configuration information of an uplink frequency resource configured in the third type of time unit and configuration information of a downlink frequency resource configured in the third type of time unit are unchangeable; and configuration information of an uplink frequency resource configured in the fourth type of time unit and configuration information of a downlink frequency resource configured in the fourth type of time unit are changeable.

Optionally, the first type of time unit, the second type of time unit, the third type of time unit, and the fourth type of time unit meet a time division multiplexing requirement, and the first type of time unit and the third type of time unit meet a periodic requirement.

Optionally, the dynamic signaling or the semi-static signaling further includes information about a guard period GP.

Optionally, the time unit includes at least one of the following:

a radio-frame-based time unit, a subframe-based time unit, a timeslot-based time unit, or a symbol-based time unit.

Optionally, the specific frequency band is a continuous spectrum resource.

The processor 1601 may be a general-purpose central processing unit (CPU), a microprocessor, an application-specific integrated circuit (application-specific integrated circuit, ASIC), or one or more integrated circuits that are configured to control program execution of the solution of the present invention.

Embodiment 6

Figure 17:
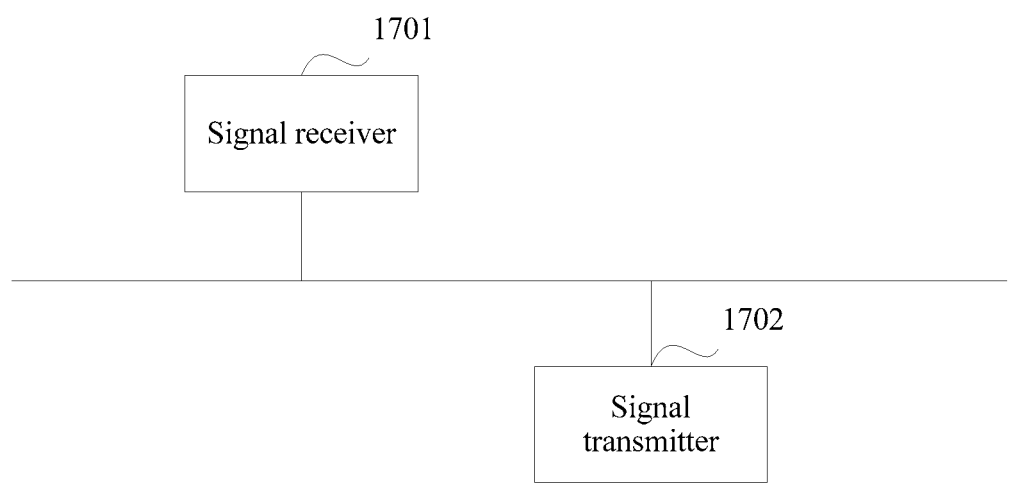
FIG. 17 is a schematic structural diagram of a data transmission device according to Embodiment 6 of the present invention.

As shown in FIG. 17, FIG. 17 is a schematic structural diagram of a data transmission device according to Embodiment 6 of the present invention. The data transmission device includes a signal receiver 1701 and a signal transmitter 1702.

The signal receiver 1701 is configured to receive, on a configured downlink frequency resource, downlink data sent by an eNodeB.

The signal transmitter 1702 is configured to send uplink data to the eNodeB on a configured uplink frequency resource.

The configured uplink frequency resource is an uplink frequency resource that is used for transmitting uplink data and that is configured by the eNodeB in different time units on a specific frequency band according to different duplex modes, the configured downlink frequency resource is a downlink frequency resource that is used for transmitting downlink data and that is configured by the eNodeB in different time units on the specific frequency band according to different duplex modes, and the different duplex modes include a time division duplex TDD mode, a frequency division duplex FDD mode, and a full-duplex mode.

Optionally, the signal receiver 1701 is further configured to receive dynamic signaling sent by the eNodeB, where configuration information of an uplink frequency resource in different time units and configuration information of a downlink frequency resource in different time units are indicated in the dynamic signaling, and the configuration information includes a resource location and/or a bandwidth occupied by a resource.

Optionally, the signal receiver 1701 is further configured to receive semi-static signaling sent by the eNodeB, where duplex modes for configuring an uplink frequency resource and a downlink frequency resource in different time units are indicated in the semi-static signaling, and the duplex modes include at least one of a TDD mode, an FDD mode, or a full-duplex mode.

Optionally, the signal receiver 1701 is further configured to: receive semi-static signaling sent by the eNodeB, where the semi-static signaling is used to indicate duplex modes for configuring an uplink frequency resource and a downlink frequency resource in different time units, and the duplex modes include at least one of a TDD mode, an FDD mode, or a full-duplex mode; and receive dynamic signaling sent by the eNodeB, where the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data transmission method, comprising:
separately configuring, by a base station in different time units on a specific frequency band according to different duplex modes, an uplink frequency resource used for transmitting uplink data and a downlink frequency resource used for transmitting downlink data, wherein the different duplex modes comprise a time division duplex (TDD) mode, a frequency division duplex (FDD) mode, and a full-duplex mode; and
sending, by the base station, downlink data to a user equipment (UE) using the configured downlink frequency resource, and receiving, using the configured uplink frequency resource, uplink data sent by the UE, wherein the separately configuring comprises:
configuring, by the base station, the specific frequency band as the uplink frequency resource or configuring the specific frequency band as the downlink frequency resource in a first time unit according to the TDD mode;
configuring, by the base station, a first frequency resource on the specific frequency band as the uplink frequency resource and configuring a second frequency resource on the specific frequency band as the downlink frequency resource in a second time unit according to the FDD mode, wherein the first frequency resource and the second frequency resource do not overlap;
configuring, by the base station, the first frequency resource on the specific frequency band as the uplink frequency resource and configuring the second frequency resource on the specific frequency band as the downlink frequency resource in a third time unit according to the FDD mode, and configuring a third frequency resource on the specific frequency band as both the uplink frequency resource and the downlink frequency resource in the third time unit according to the full-duplex mode; and
configuring, by the base station, the specific frequency band as both the uplink frequency resource and the downlink frequency resource in a fourth time unit according to the full-duplex mode.

2. The data transmission method according to claim 1, wherein the uplink frequency resource and the downlink frequency resource that are configured by the base station in different time units according to the FDD mode are changeable.

3. The data transmission method according to claim 2, wherein the uplink frequency resource and the downlink frequency resource that are configured by the base station in different time units according to the FDD mode meet at least one of the following cases:
the uplink frequency resource or the downlink frequency resource configured by the base station in a time unit on the specific frequency band according to the FDD mode meets discrete distribution;
the uplink frequency resource configured by the base station in a time unit on the specific frequency band according to the FDD mode is distributed on two sidebands in the specific frequency band, wherein the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;
the downlink frequency resource configured by the base station in a time unit on the specific frequency band according to the FDD mode is distributed on a third subband that is centered on a center carrier of the specific frequency band and that is distributed symmetrically and continuously, wherein a bandwidth occupied by the third subband is less than a total available bandwidth of the specific frequency band;
the uplink frequency resource configured by the base station in a time unit on the specific frequency band according to the FDD mode is distributed on a fourth subband that is centered on a center carrier of the specific frequency band and that is distributed symmetrically and continuously, wherein a bandwidth occupied by the fourth subband is less than a total available bandwidth of the specific frequency band; or
the uplink frequency resource or the downlink frequency resource configured by the base station in a time unit according to the FDD mode is continuously distributed.

4. The data transmission method according to claim 3, wherein if the uplink frequency resource and the downlink frequency resource that are configured by the base station in a time unit according to the FDD mode meet discrete distribution, the uplink frequency resource and the downlink frequency resource meet equal-interval distribution.

5. The data transmission method according to claim 3, wherein if the uplink frequency resource or the downlink frequency resource configured by the base station in a time unit according to the FDD mode is continuously distributed, a proportion of the configured uplink frequency resource to the configured downlink frequency resource is changeable.

6. A data transmission method, comprising:
receiving, by a user equipment (UE) on a configured downlink frequency resource, downlink data sent by a base station, and sending uplink data to the base station on a configured uplink frequency resource, wherein
the configured uplink frequency resource is an uplink frequency resource that is used for transmitting uplink data and that is configured by the base station in different time units on a specific frequency band according to different duplex modes, the configured downlink frequency resource is a downlink frequency resource that is used for transmitting downlink data and that is configured by the base station in different time units on the specific frequency band according to different duplex modes, and the different duplex modes comprise a time division duplex (TDD) mode, a frequency division duplex (FDD) mode, and a full-duplex mode, the method further comprising
receiving, by the UE, semi-static signaling sent by the base station, wherein the semi-static signaling is used to indicate duplex modes for configuring an uplink frequency resource and a downlink frequency resource in different time units, and the duplex modes comprise at least one of a TDD mode, an FDD mode, or a full-duplex mode; and
receiving, by the UE, dynamic signaling sent by the base station, wherein the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

7. The data transmission method according to claim 6, wherein the method further comprises:
receiving, by the UE, dynamic signaling sent by the base station, wherein configuration information of an uplink frequency resource in different time units and configuration information of a downlink frequency resource in different time units are indicated in the dynamic signaling, and the configuration information comprises a resource location and/or a bandwidth occupied by a resource.

8. The data transmission method according to claim 6, wherein the method further comprises:
receiving, by the UE, semi-static signaling sent by the base station, wherein duplex modes for configuring an uplink frequency resource and a downlink frequency resource in different time units are indicated in the semi-static signaling, and the duplex modes comprise at least one of a TDD mode, an FDD mode, or a full-duplex mode.

9. A data transmission device, comprising:
a processor, configured to separately configure, in different time units on a specific frequency band according to different duplex modes, an uplink frequency resource used for transmitting uplink data and a downlink frequency resource used for transmitting downlink data, wherein the different duplex modes comprise a time division duplex (TDD) mode, a frequency division duplex (FDD) mode, and a full-duplex mode;
a signal transmitter, configured to send downlink data to a user equipment (UE) using the configured downlink frequency resource; and
a signal receiver, configured to receive, using the configured uplink frequency resource, uplink data sent by the UE, wherein
the processor is further configured to:
configure the specific frequency band as the uplink frequency resource or configure the specific frequency band as the downlink frequency resource in a first time unit according to the TDD mode;
configure a first frequency resource on the specific frequency band as the uplink frequency resource and configure a second frequency resource on the specific frequency band as the downlink frequency resource in a second time unit according to the FDD mode, wherein the first frequency resource and the second frequency resource do not overlap;
configure the first frequency resource on the specific frequency band as the uplink frequency resource and configure the second frequency resource on the specific frequency band as the downlink frequency resource in a third time unit according to the FDD mode, and configure a third frequency resource on the specific frequency band as both the uplink frequency resource and the downlink frequency resource in the third time unit according to the full-duplex mode; and
configure the specific frequency band as both the uplink frequency resource and the downlink frequency resource in a fourth time unit according to the full-duplex mode.

10. The data transmission device according to claim 9, wherein the uplink frequency resource and the downlink frequency resource that are configured by the processor in different time units according to the FDD mode are changeable.

11. The data transmission method according to claim 10, wherein the uplink frequency resource and the downlink frequency resource that are configured by the processor in different time units according to the FDD mode meet at least one of the following cases:
the uplink frequency resource or the downlink frequency resource configured in a time unit on the specific frequency band according to the FDD mode meets discrete distribution;
the uplink frequency resource configured in a time unit on the specific frequency band according to the FDD mode is distributed on two sidebands in the specific frequency band, wherein the two sidebands are respectively a first subband and a second subband, a sum of a bandwidth occupied by the first subband and a bandwidth occupied by the second subband is less than a total available bandwidth of the specific frequency band, and both the first subband and the second subband are continuously distributed bandwidths;
the downlink frequency resource configured in a time unit on the specific frequency band according to the FDD mode is distributed on a third subband that is centered on a center carrier of the specific frequency band and that is distributed symmetrically and continuously, wherein a bandwidth occupied by the third subband is less than a total available bandwidth of the specific frequency band;
the uplink frequency resource configured in a time unit on the specific frequency band according to the FDD mode is distributed on a fourth subband that is centered on a center carrier of the specific frequency band and that is distributed symmetrically and continuously, wherein a bandwidth occupied by the fourth subband is less than a total available bandwidth of the specific frequency band; or the uplink frequency resource or the downlink frequency resource configured in a time unit according to the FDD mode is continuously distributed.

12. The data transmission device according to claim 11, wherein if the uplink frequency resource and the downlink frequency resource that are configured by the processor in a time unit according to the FDD mode meet discrete distribution, the uplink frequency resource and the downlink frequency resource meet equal-interval distribution.

13. The data transmission device according to claim 11, wherein if the uplink frequency resource or the downlink frequency resource configured by the processor in a time unit according to the FDD mode is continuously distributed, a proportion of the configured uplink frequency resource to the configured downlink frequency resource is changeable.

14. A data transmission device, comprising:
a signal receiver, configured to receive, on a configured downlink frequency resource, downlink data sent by a base station; and
a signal transmitter, configured to send uplink data to the base station on a configured uplink frequency resource, wherein
the configured uplink frequency resource is an uplink frequency resource that is used for transmitting uplink data and that is configured by the base station in different time units on a specific frequency band according to different duplex modes, the configured downlink frequency resource is a downlink frequency resource that is used for transmitting downlink data and that is configured by the base station in different time units on the specific frequency band according to different duplex modes, and the different duplex modes comprise a time division duplex (TDD) mode, a frequency division duplex (FDD) mode, and a full-duplex mode, wherein the signal receiver is further configured to:
receive dynamic signaling sent by the base station, wherein configuration information of an uplink frequency resource in different time units and configuration information of a downlink frequency resource in different time units are indicated in the dynamic signaling, and the configuration information comprises a resource location and/or a bandwidth occupied by a resource;
receive semi-static signaling sent by the base station, wherein the semi-static signaling is used to indicate duplex modes for configuring an uplink frequency resource and a downlink frequency resource in different time units, and the duplex modes comprise at least one of a TDD mode, an FDD mode, or a full-duplex mode; and
receive dynamic signaling sent by the base station, wherein the dynamic signaling is used to indicate, in each time unit indicated by the semi-static signaling, configuration information for configuring an uplink frequency resource on the specific frequency band in a duplex mode for configuring the uplink frequency resource in the time unit indicated by the semi-static signaling and configuration information for configuring a downlink frequency resource on the specific frequency band in a duplex mode for configuring the downlink frequency resource in the time unit indicated by the semi-static signaling.

15. The data transmission device according to claim 14, wherein
the signal receiver is further configured to receive semi-static signaling sent by the base station, wherein duplex modes for configuring an uplink frequency resource and a downlink frequency resource in different time units are indicated in the semi-static signaling, and the duplex modes comprise at least one of a TDD mode, an FDD mode, or a full-duplex mode.

* * * * *